(12) United States Patent
Shmukler et al.

(10) Patent No.: US 9,536,245 B2
(45) Date of Patent: Jan. 3, 2017

(54) METHOD AND APPARATUS FOR DELIVERING CUSTOMIZED INFORMATION ACCORDING TO A USER'S PROFILE

(75) Inventors: Elliot Shmukler, Boston, MA (US); Joshua J. Schanker, Boston, MA (US)

(73) Assignee: ABOUT, INC., New York, NY (US)

( * ) Notice: Subject to any disclaimer, the term of this patent is extended or adjusted under 35 U.S.C. 154(b) by 191 days.

(21) Appl. No.: 12/842,154

(22) Filed: Jul. 23, 2010

(65) Prior Publication Data

US 2011/0231496 A1   Sep. 22, 2011

Related U.S. Application Data

(63) Continuation of application No. 10/862,920, filed on Jun. 7, 2004, now Pat. No. 7,793,213, and a continuation of application No. 09/585,511, filed on Jun. 1, 2000, now abandoned.

(51) Int. Cl.
| | |
|---|---|
| *G06F 17/00* | (2006.01) |
| *G06Q 30/02* | (2012.01) |
| *G06F 17/24* | (2006.01) |
| *G06Q 10/10* | (2012.01) |
| *G06F 17/30* | (2006.01) |
| *G06Q 30/06* | (2012.01) |

(52) U.S. Cl.
CPC ............ *G06Q 30/02* (2013.01); *G06F 17/248* (2013.01); *G06F 17/30867* (2013.01); *G06Q 10/107* (2013.01); *G06Q 30/0241* (2013.01); *G06Q 30/0633* (2013.01)

(58) Field of Classification Search
CPC ............ G06Q 10/107; G06Q 30/0241; G06Q 30/0633; H04L 67/02; H04L 67/42; H04L 67/306; G06F 17/21; G06F 17/24; G06F 17/30; G06F 17/243; G06F 17/248; G06F 17/30867

USPC ............ 715/200–205, 209–210, 221–222, 224,715/234–235, 238–239, 243, 253, 254–255,715/273, 276; 709/203, 206–207, 217–219

See application file for complete search history.

(56) References Cited

U.S. PATENT DOCUMENTS

| | | | | |
|---|---|---|---|---|
| 5,426,594 | A | * | 6/1995 | Wright et al. ............... 709/206 |
| 5,515,098 | A | | 5/1996 | Carles ............................ 725/35 |
| 5,717,923 | A | * | 2/1998 | Dedrick |
| 5,740,549 | A | | 4/1998 | Reilly et al. .............. 705/14.42 |
| 5,758,257 | A | | 5/1998 | Herz et al. ................... 726/116 |
| 5,761,662 | A | * | 6/1998 | Dasan |

(Continued)

OTHER PUBLICATIONS

Wikipedia entry for SMTP, downloaded Nov. 15, 2013, 12 pages.*

(Continued)

*Primary Examiner* — Cesar Paula
*Assistant Examiner* — James H Blackwell
(74) *Attorney, Agent, or Firm* — Hunton & Williams LLP

(57) ABSTRACT

A system for providing an individual user with customized information is described. The user provides the system with the user's preferences. The system compares each user's preferences to a database to provide the user with notification via an e-mail newsletter sent over a computer network. The newsletter is individually prepared for each user by dynamically populating the newsletter with the necessary information as the newsletter is being sent to the individual. Thus, there is no need to first prepare the newsletter, store it, send it, and delete it. This approach reduces the need for more equipment as the number of needed newsletters increases.

12 Claims, 30 Drawing Sheets

(56) References Cited

U.S. PATENT DOCUMENTS

| | | | | |
|---|---|---|---|---|
| 5,768,505 A * | 6/1998 | Gilchrist | ............. | G06Q 10/107 709/201 |
| 5,794,221 A | 8/1998 | Egendorf | ........................ | 705/40 |
| 5,832,448 A * | 11/1998 | Brown | ................ | A61B 5/0002 705/2 |
| 5,845,303 A | 12/1998 | Templeman | .................. | 715/255 |
| 5,850,520 A * | 12/1998 | Griebenow et al. | .......... | 709/206 |
| 5,890,175 A | 3/1999 | Wong et al. | .................. | 715/236 |
| 5,933,811 A | 8/1999 | Angles et al. | ............. | 705/14.56 |
| 5,937,162 A | 8/1999 | Funk et al. | .................... | 709/206 |
| 5,963,925 A * | 10/1999 | Kolling et al. | ................. | 705/40 |
| 5,995,943 A | 11/1999 | Bull et al. | .................. | 705/14.39 |
| 6,029,182 A * | 2/2000 | Nehab et al. | ................. | 715/205 |
| 6,064,980 A | 5/2000 | Jacobi et al. | ................. | 705/26.7 |
| 6,101,485 A | 8/2000 | Fortenberry et al. | ........ | 705/26.8 |
| 6,119,101 A | 9/2000 | Peckover | ..................... | 705/7.31 |
| 6,119,152 A | 9/2000 | Carlin et al. | .................. | 709/217 |
| 6,128,600 A | 10/2000 | Imamura et al. | .......... | 705/26.41 |
| 6,141,666 A * | 10/2000 | Tobin | ............................. | 715/207 |
| 6,219,680 B1 | 4/2001 | Bernardo et al. | ............. | 715/234 |
| 6,266,649 B1 | 7/2001 | Linden et al. | ............... | 705/7.29 |
| 6,272,507 B1 | 8/2001 | Pirolli et al. | .................. | 715/206 |
| 6,338,044 B1 | 1/2002 | Cook et al. | ............... | 705/14.54 |
| 6,370,513 B1 | 4/2002 | Kolawa et al. | ................ | 705/7.33 |
| 6,377,963 B1 * | 4/2002 | Walker et al. | ................. | 715/207 |
| 6,421,693 B1 * | 7/2002 | Nishiyama et al. | .......... | 715/226 |
| 6,424,981 B1 * | 7/2002 | Isaac et al. | .................... | 715/273 |
| 6,434,556 B1 * | 8/2002 | Levin et al. | | |
| 6,434,747 B1 * | 8/2002 | Khoo et al. | ...................... | 725/46 |
| 6,442,529 B1 | 8/2002 | Krishan et al. | ............ | 705/14.52 |
| 6,449,635 B1 * | 9/2002 | Tilden et al. | ................. | 709/206 |
| 6,460,036 B1 * | 10/2002 | Herz | ............................ | 707/748 |
| 6,477,704 B1 | 11/2002 | Cremia | ............................ | 725/35 |
| 6,480,885 B1 * | 11/2002 | Olivier | .......................... | 709/207 |
| 6,505,202 B1 * | 1/2003 | Mosquera | ........... | G06F 17/3053 |
| 6,572,662 B2 | 6/2003 | Manohar et al. | ............. | 715/273 |
| 6,578,043 B2 | 6/2003 | Nye | ........................... | 707/999.1 |
| 6,615,251 B1 | 9/2003 | Klug et al. | .................... | 709/218 |
| 6,622,174 B1 | 9/2003 | Ukita et al. | ................... | 709/246 |
| 6,646,659 B1 | 11/2003 | Brown et al. | ................. | 715/811 |
| 6,671,715 B1 * | 12/2003 | Langseth et al. | ............. | 709/203 |
| 6,757,691 B1 | 6/2004 | Welsh et al. | ............ | 348/E7.071 |
| 6,807,558 B1 | 10/2004 | Hassett et al. | ................. | 709/203 |
| 6,836,792 B1 * | 12/2004 | Chen | ............................ | 709/220 |
| 6,981,214 B1 * | 12/2005 | Miller et al. | ................... | 715/234 |
| 6,999,993 B1 * | 2/2006 | Shah et al. | ..................... | 709/207 |
| 7,072,932 B1 | 7/2006 | Stahl | ............................. | 709/203 |
| 7,124,090 B1 * | 10/2006 | Howard et al. | ............ | 705/14.73 |
| 7,149,964 B1 * | 12/2006 | Cottrille et al. | .............. | 715/234 |
| 7,150,030 B1 | 12/2006 | Eldering et al. | ................ | 725/46 |
| 7,158,986 B1 | 1/2007 | Oliver et al. | ................ | 79/93.24 |
| 7,278,094 B1 * | 10/2007 | Dreyer et al. | .................. | 715/234 |
| 7,904,922 B1 * | 3/2011 | Haberman et al. | ............. | 725/35 |
| 8,006,261 B1 * | 8/2011 | Haberman et al. | ............. | 725/34 |
| 2002/0010626 A1 | 1/2002 | Agmoni | ..................... | 705/14.58 |
| 2002/0054089 A1 | 5/2002 | Nicholas et al. | ............. | 715/745 |
| 2002/0131561 A1 * | 9/2002 | Gifford et al. | ............... | 379/67.1 |

OTHER PUBLICATIONS

Brown, M. et al.,"Essential Perl 5 for Web Professionals, Chapter 2: Email Script!," © 1999, Prentice Hall, pp. 17-35.*

Hedrick, C.,"Introduction to the Internet Protocols," © Jul. 3, 1987, Center for Computers and Information Services, Rutgers University, 3 pages.*

Popyack, J. et al.,"Mail Merge as a First Programming Language," © 1993, ACM, pp. 136-140.*

Slatalla, M.,"Online Shopper; Let Someone Else Look for Bargains," © Apr. 20, 2000, The New York Times, 5 pages.*

Widyantoro, H.D.,"Thesis: Dynamic Modeling and Learning User Profile in Personalized News Agent," © May 1999, Texas A&M University, 104 total pages.*

* cited by examiner

BargainDog: The Best Bargains From The Best Sites – Microsoft Internet Explorer File  Edit  View  Go  Favorites  Help Back | Forward | Stop | Refresh | Home | Search | Favorites | History | Channels | Fullscreen | Mail | Print Address: http://www.bargaindog.com/members/edit/ your privacy. Please see our privacy policy approved by TRUSTe.

Newsletter Preferences:

In what format would you like your BargainDog newsletter? (I don't know. Help me decide.)
- 502 — ● HTML Enhanced  *(Outlook, Hotmail and other web-based e-mails)*
- 504 — ○ Text Only  *(AOL, Eudora, Juno and other text-based e-mails)*

How often would you like to receive your BargainDog newsletter?
506 — [Daily ▼] — 508

How long would you like each of your newsletters?
510 — [Average (about 20 bargains) ▼] — 512

Tell us about yourself:
BargainDog plans to add discounts at local stores, birthday promotions and specials for men and women. Sign up now so you don't miss out!

Your Zip Code:  [02210] — 514

Your Birthday:  [January ▼] 516a , [1 ▼] 516b , [1960 ▼] 516c

Your Gender:  ● Male   ○ Female — 520
                518

[ Submit and go to customization page. ] — 522

Opening page http://www.bargaindog.com/members/edit/     Internet zone

| FIG. 8A | FIG. 8B | FIG. 8C |

FIG. 8

| FIG. 6A | FIG. 6B |

FIG. 6

Your Shopping Preferences:
Please tell us how interested you are in receiving bargains in the following categories. We use your choices to generate a newsletter that is personalized just for you!

| | Not interested | Somewhat Interested | Interested | Very Interested | Extremely Interested | Further Customize? |
|---|---|---|---|---|---|---|
| Apparel & Accessories | ○ | ○ | ⊙ | ○ | ○ | ☑ |
| Books & Magazines | ○ | ○ | ⊙ | ○ | ○ | ☑ |
| Career & Professional | ○ | ⊙ | ○ | ○ | ○ | ☐ |
| Computing | ○ | ○ | ⊙ | ○ | ○ | ☑ |
| Cooking & Food | ⊙ | ○ | ○ | ○ | ○ | |
| Electronics & Gadgets | ○ | ○ | ○ | ⊙ | ○ | ☑ |
| Health & Beauty | ⊙ | ○ | ○ | ○ | ○ | ☐ |
| Hobbies | ⊙ | ○ | ⊙ | ○ | ○ | ☑ |
| Home & Garden | ○ | ○ | ⊙ | ○ | ○ | ☑ |
| Movies | ⊙ | ○ | ⊙ | ○ | ○ | |
| Music | ○ | ○ | ⊙ | ○ | ○ | ☑ |
| Parenting & Children | ○ | ○ | ○ | ○ | ○ | ☑ |
| Pets | ⊙ | ○ | ○ | ○ | ○ | ☑ |

HTML Template 1400

```
<!suspend_auto_output>
<!load_module path=/s/ehtml/tags.so>
<!load_module path=/s/ehtml/basic.so>
<!load_module path=/s/ehtml/control.so>
<!load_module path=/s/ehtml/function.so>
<!load_module path=/s/ehtml/dbmysql.so>
<!load_module path=/s/ehtml/bdogmisc.so>    1402
<!load_module path=/s/ehtml/sem.so>
<!resume_auto_output>From: BargainDog <comments@bargaindog.com>
To: <!var name=template_key>
Subject: Bargains from BargainDog!          1404
MIME-Version: 1.0
Content-Type: text/html; charset="us-ascii"
Content-Disposition: inline; filename="bargaindog.html"

!sem_op key=qmdb op=-1><!if cond=<!not_equal left=<!dbopen name=bargains
host=192.168.0.100> right=>><!template_defer><!/if>

<html><head>
<title>Bargains from BargainDog!</title></head>
<body bgcolor="#FFFFFF">

<!-- If you are reading this message, then the newsletter format
     you have selected cannot be understood by your e-mail program.

Please go to the Bargain Dog members page at
        http://www.bargaindog.com/members/
     and switch your newsletter to the text-only format. -->

<table border=0 cellpadding=5 cellspacing=0 width=468>
<tr><td colspan=3 align="center">
<a href="http://www.bargaindog.com/"><img
src="http://www.bargaindog.com/graphics/emaillogo25.gif" border=0></a>
</td></tr>

<!suspend_auto_output>
<!-- Basic User Info -->
<!dbselect query='select id, first_name, len,
                DATE_FORMAT(DATE_SUB(\'<!var name=day>\', INTERVAL <!var
name=interval>
DAY), \'%Y%m%d\'),
                DATE_FORMAT(\'<!var name=day>\', \'%M %d, %y\')
                from users where email =
                <!dbliteral value=<!var name = template_key>>'>
<!var name=uid value=<!dbfield num=1>>
<!var name=first_name value=<!dbfield num=2>>
<!var name=len value=<!dbfield num=3>>
<!var name=startday value=<!dbfield num=4>>
<!var name=nice_date value=<!dbfield num=5>>
<!/dbselect>
                    1406
<!-- The Query -->
```

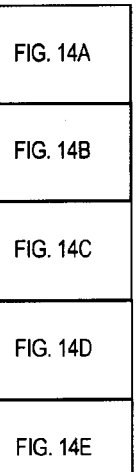

```
<!var name=qry value='select bargain_cat.id,
            substring(min(concat((bargains.cat_id <> bargain_cat.cat),
                                bargain_cat.cat)), 2),
                    min((bargains.cat_id <> bargain_cat.cat)) as pri,
                    count(*) as cnt, bargains.quality
                from bargains straight_join bargain_cat straight_join user_cat
                where
                    bargains.id = bargain_cat.id
                    and bargain_cat.cat = user_cat.cat
                    and user_cat.id = <!var name=uid>
                    and bargains.start_date >= <!var name=startday>
                    and bargains.start_date < <!var name=day>
                    and bargains.cat_id > 0
                            and ((bargain_cat.bits1 = 0) or
                        (user_cat.bits1 & bargain_cat.bits1))
                    and ((bargain_cat.bits2 = 0) or
                        (user_cat.bits2 & bargain_cat.bits2))
                    and ((bargain_cat.bits3 = 0) or
                        (user_cat.bits3 & bargain_cat.bits3))
                group by bargain_cat.id
                order by bargains.quality DESC, cnt DESC, bargains.id DESC'>       ~1408

<!var name=row1 value='<tr>'>
<!var name=row2 value='<tr>'>
<!var name=row3 value='<tr>'>

<!var name=list value=">
<!var name=c value=0>

<!dbselect var=r query='<!var name=qry> limit <!var name=len>'>

<!if_else cond=<!less left=<!var name=c> right=3>>

<!var name=c value=<!plus <!var name=c> 1>>

<!var name=row1
value='!var name=row1><td width=33% valign="bottom" align="center">
        <a target=_blank href="http://www.bargaindog.com/prod/?id=!dbfield
num=1>&uid=<!var name=uid>"><img border=0
        src="http://www.bargaindog.com/pics/<!dbfield num=1>.jpg"></a></td>'>

<!dbselect query='select bargains.name, short_txt, merchants.name,
            IF(strike<>\'0.00\',
                            concat(\'<s>\$\', strike, \'</s>  \'),
                            \'\'),
            IF(price<>\'0.00\', concat(\'$\', price), \'Free!\'),
                bargains.id
        from bargains, merchants where
                bargains.id = <!dbfield num=1>
                and bargains.mer_id = merchants.id'>

<!var name=row2 value='<!var name=row2><td width=33% valign="top"
```

FIG. 14B

```
align="center">
        <table border=0 cellspacing=0 cellpadding=2 bgcolor="yellow">
        <tr><td>
        <nobr>
<font face="arial,helvetica" size=-1 color="#000066"><b><!dbfield num=4>
<font color="AA3333"><!dbfield num=5></b></font>
        </td></tr></table></td>'>

<!var name=row3 value='<!var name=row3><td width=33% valign="top"
align="center">
<a target=_blank href="http://www.bargaindog.com/prod/?id=<!dbfield
num=6>&uid=<!var name=uid>"><font face="arial,helvetica" size=-1
color="#000066"><b><!dbfield num=1></b></font></a><br><font
face="arial,helvetica" color="#000066" size=-2>
<!dbfield num=2><br><font color="AA3333"><b>At
<!dbfield num=3></b><br></font></td/>'>
<!dbselect <!else>

<!dbselect query='select bargains.name, short_txt, merchants.name,
                IF(strike<>\'0.00\',
                                concat(\'<s>\$\', strike, \'</s>  \'),
                                \'\'),
                IF(price<>\'0.00\', concat(\'$\', price), \'Free!\'),
                        bargains.id, <!dbfield num=2>
        from bargains, merchants where
                bargains.id = <!dbfield num=1>
                and bargains.mer_id = merchants.id'>

<!if_else cond=<!equal left=" right=<!var name=cat<!dbfield num=7>>>>

<!dbselect query='select name_full, id from categories where
                        id = !dbfield num=7>'>

<!var name=cat<!dbfield num=2> value='<tr><td colspan=3 align=center>
        <table width=100% border=0 cellspacing=0 cellpadding=0
                bgcolor="#000066"><tr><td align="center" width=100%>
        <font face="arial,helvetica" size=-1 color="#FFFFFF">
        <nobr><b><!dbfield num=1></b></nobr>
        </font>
        </td></tr></table></td></tr>

<tr><td colspan=3 align=center>'>
        <!var name=list value='<!var name=list><\!var name=cat<!dbfield
num=2>></td></tr>'>

<!/dbselect>
<!else>

<!var name=cat<!dbfield num=7> value='<!var name=cat<!dbfield num=7>><br>'>

<!/if_else>

<!var name=cat<!dbfield num=7> value='<!var name=cat<!dbfield num=7>>
```

FIG. 14C

```
<a target=_blank href="http://www.bargaindog.com/prod/?id=<!dbfield
num=6>&uid=<!var name=uid>">
        <font face="arial,helvetica" size=-1 color="#000066">
        <b><!dbfield num=1></b></font></a>  <font face="arial,helvetica"
        color="#000066" size=-1><b><!dbfield num=4><font
        color="AA3333"><!dbfield num=5></b><br></font>
        <!dbfield num=2>
        <br><font color="AA3333"><b>At <!dbfield num=3></b><br></font></font>'>

<!/dbselect>
<!/if_else>

<!/dbselect>

<!if cond=<!equal left=<!var name=r> right=0>><!template_fail><!/if>

<!var name=row1 value='<!var name=row1></tr>'>
<!var name=row2 value='<!var name=row2></tr>'>
<!var name=row3 value='<!var name=row3></tr>'>

<!/resume_auto_output>

<tr><td colspan=3 align="center">
<font face="arial,helvetica" size=-1="AA3333">
<b><nobr><!if_else cond=<!equal left=<!var name=first_name>
right="">>Your<!/else><!possess_word word=<!var name=first_name>><!/if_else>
BargainDog newsletter - <!var name=nice_date></nobr></b></font></td></tr>

<!var name=row1>
<!var name=row2>
<!var name=row3>

<!/dbselect query='select id, copy from newsads where
                    run_date = <!var name=day> and format = 1'>
<!var name=ad value=<!dbfield num=2>>
<tr><td colspan=3 align="center">
<hr color="#000066" size=1 noshade>
<font size=-2 color="AA3333" face="arial,helvetica">
ADVERTISEMENT
<br>
<!call name=ad>
<br>
<hr color="#000066" size=1 noshade>
</td></tr>
<!/dbselect><!sem_op key=qmdb op=1><!dbclose>

<!if cond=<!greater left=<!var name=r> right=3>><tr><td colspan=3
align=center>
<font face="arial,helvetica" size=-1 color="AA3333">
<b><nobr>More Bargains From BargainDog:</nobr></b></font>
</td></tr><!call name=list><!if>

<tr><td colspan=3 align=center>
    <table width=100% border=0 cellspacing=0 cellpadding=0
        bgcolor="#000066"><tr><td align="center" width=100%>
    <font face="arial,helvetica" size=-1 color="FFFFFF">
```

FIG. 14D

```
        <nobr><b>BargainDog Information</b></nobr>
        </font>
        </td></tr></table>
</td></tr>

<tr><td colspan=3 align="left">

<font face="arial,helvetica" size=1 color="#AA3333">
<b>Subscription Information</b><br>
<font color="#000066">
You are subscribed to this newsletter as "<!var name=template_key>".
<br>
To change your preferences, customize your category selections, or
unsubscribe from the newsletter, please
go to <a target=_blank href="http://www.bargaindog.com/members/">Our Members
Page</a>.
<br><br>
</font>

<b>Disclaimer</b>
<br><font color="#000066">
This e-mail is meant for information purposes only, and is not a guarantee
that the products listed may be purchased at the above prices. BargainDog,
its affiliated and non-affiliated merchants make no promises or
guarantees about the price, quality or availability of products it lists in
this service. For a full description of BargainDog's policies, see our
<a target=_blank href="http://www.bargaindog.com/static/terms.ehtml">terms
and
conditions</a>.

</td></tr>
</table>

</body></html>

© 1999 – 2000 Sombasa Media, Inc. All Rights Reserved.
```

FIG. 14E

From: BargainDog [comments@bargaindog.com]
Sent: Wednesday, May 24, 2000 12:00 AM
To: psorkin@wgslaw.com
Subject: Bargains from BargainDog!

BargainDog

Paul's BargainDog Newsletter – May 24, 2000

1502 {

Free!
The Resurrected &
Grave Indiscretion
- VHS
Now watch Sting in
Grave Indiscretion or be
horrified by The
Resurrected for FREE
when you pay $4.95
each for shipping!
At
FreeStuffThisWeek.com

1504 {

~~$34.95~~ $14.95
Expedia Streets
Deluxe & Trip
Planner 2000
Get address-to-address
routing, detailed driving
directions, and trip-
planning all in one with
Expedia Streets and
Trips 2000, 57% off with
$20 mail-in rebate!
At Software Buyline ~~$34.99~~ $16.99
Kideo Animated
"And the Oscar goes to..."
Now you can make that
dream come true with a
personalized video from
Kideo. Now 51% off!
At EToys

} 1506

More Bargains From BargainDog:
Career & Professional

Sports Ball Mousepads ~~$12.95~~ $4.00
Give your favorite sports fan a treat with their very own       ~1508
personalized mouse pad. Now 69% off!
At Personal Creations Electronics & Gadgets

Midland 75-507 14-Channel Family Radio (Single)
~~$79.95~~ $19.99
This tiny, inexpensive 2-way radio packs just enough features   ~1510
for the casual user to make it a terrific deal. Now 75% off!
At Amazon.com Movies
Two Free Blockbuster Movie Rentals with $25.00 Purchase
Free!
Now at PetsMart.com, spend $25 and receive a Blockbuster        ~1512
Movie Card good for 2 FREE movie rentals!
At PetsMart.com Apparel & Accessories
Men's Golfer Silk Tie ~~$26.00~~ $19.00
This classic Renato Balestra Italian silk tie will make a winning   ~1514
impression on your next interview or date! Now save 37%!
At tiemaster.com BargainDog Information
Subscription Information
You are subscribed to this newsletter as "psorkin@wgslaw.com". To change your preferences, customize your category
selections, or unsubscribe from the newsletter, please go to Our Members Page.
Disclaimer
This e-mail is meant for informational purposes only, and is not a guarantee that the products listed may be purchased at the
above prices. BargainDog, its affiliated and non-affiliated merchants make no promises or guarantees about the price, quality or
availability of products it lists in this service. For a full description of BargainDog's policies, see our terms and conditions.

FIG. 15

```
<META HTTP-EQUIV="Content-Type" CONTENT="text/html; charset=iso-8859-1">

<html><head>
<META HTTP-EQUIV="Content-Type" CONTENT="text/html; charset=iso-8859-1">

<title>Bargains from BargainDog!</title></head>
<body bgcolor="#FFFFFF">
<!-- If you are reading this message, then the newsletter format
    you have selected cannot be understood by your e-mail program
     Please go to the Bargain Dog members page at
          http://www.bargaindog.com/members/
     and switch your newsletter to the text-only format. -->

<table border=0 cellpadding=5 cellspacing=0 width=468>
<tr><td colspan=3 align="center">
<a href="http://www.bargaindog.com/"><img src="http://www.bargaindog.com/graphics/emaillogo25.gif"
border=0></a>
</td></tr>

<tr><td colspan=3 align="center">
<font face="arial,helvetica" size=-1 color="#AA3333">
<b><nobr>Paul's BargainDog Newsletter – May 24, 2000</nobr></b></font></td><tr>
```

1602 {
```
<tr><td width=33% valign="bottom" align="center">
         <a target=_blank href="http://www.bargaindog.com/prod/?id=4739&uid=478810"><img border=0
         src="http://www.bargaindog.com/pics/4739.jpg"></a></td><td width=33% valign="bottom"
align="center">
```
}

1604 {
```
         <a target=_blank href="http://www.bargaindog.com/prod/?id=4758&uid=478810"><img border=0
         src="http://www.bargaindog.com/pics/4758.jpg"></a></td><td width=33% valign="bottom"
align="center">
```
}

```
         <a target=_blank href="http://www.bargaindog.com/prod/?id=4742&uid=478810"><img border=0
         src="http://www.bargaindog.com/pics/4742.jpg"></a></td></tr>
```
} 1606

```
<tr><td width=33% valign="top" align="center">
         <table border=0 cellspacing=0 cellpadding=2 bgcolor="yellow">
         <tr><td>
         <nobr>
```

1608 {
```
<font face="arial,helvetica" size=-1 color="#000066"><b>
<font color="#AA3333">Free!</b></font>
```
}

```
         <td></tr></table></td><td width=33% valign="top" align="center">
         <table border=0 cellspacing=0 cellpadding=2 bgcolor="yellow">
         <tr><td>
         <nobr>
<font face="arial,helvetica" size=-1 color="#000066"><b><s>$34.95</s>  
<font color="#AA3333">$14.95</b></font>
```
} 1610

```
         </td></tr></table></td><td width=33% valign="top" align="center">
         <table border=0 cellspacing=0 cellpadding=2 bgcolor="yellow">
         <tr><td>
         <nobr>
<font face="arial,helvetica" size=-1 color="#000066"><b><s>$34.99</s>  
<font color="#AA3333">$16.99</b></font>
```
} 1612

```
         </td></tr></table></td></tr>
<tr><td width=33% valign="top" align="center">
```

| Fig. 16A |
|---|
| Fig. 16B |
| Fig. 16C |
| Fig. 16D |

```
<a target=_blank href="http://www.bargaindog.com/prod/?id=4739&uid=478810"><font
face="arial,helvetica" size=-1
color="#000066"><b>The Resurrected & Grave Indiscretion – VHS</b></font></a><br><font
1614 face="arial,helvetica" color="#000066" size=-2>
Now watch Sting in Grave Indiscretion or be horrified by The Resurrected for FREE when you pay $4.95
each for shipping!<br><font color="#AA3333"><b>At
FreeStuffThisWeek.com</b><br></font></td><td width=33% valign="top" align="center">
<a target=_blank href="http://www.bargaindog.com/prod/?id=4758&uid=478810"><font
face="arial,helvetica" size=-1
color="#000066"><b>Expedia Streets Deluxe & Trip Planner 2000</b></font></a><br><font
1616 face="arial,helvetica" color="#000066" size=-2>
Get address-to-address routing, detailed driving directions, and trip-planning all in one with Expedia
Streets and Trips 2000, 57% off with $20 mail-in rebate!<br><font color="#AA3333"><b>At
SoftwareBuyline</b><br></font><td width=33% valign="top" align="center">
<a target=_blank href="http://www.bargaindog.com/prod/?id=4742&uid=478810"><font
face="arial,helvetica" size=-1
color="#000066"><b>Kideo Animated</b></font></a><br><font face="arial,helvetica" color="#000066"
1618 Size=-2>
"And the Oscar goes to..." Now you can make that dream come true with a personalized video from
Kideo. Now 51% off!<br><font color="#AA3333"><b>At
Etoys</b><br></font></td></tr>

<tr><td colspan=3 align=center>
<font face="arial,helvetica" size=-1 color="#AA3333">
<b><nobr>More Bargains From BargainDog:</nobr></b></font>
</td></tr><tr><td colspan=3 align=center>
        <table width=100% border=0 cellspacing=0 cellpadding=0
                bgcolor="#000066"><tr><td align="center" width=100%>
        <font face="arial,helvetica" size=-1 color="#FFFFFF">
        <nobr><b>Career & Professional</b></nobr>
        </font>
        </td></tr></table></td></tr>

<tr><td colspan=3 align=center>
<a target=_blank href="http://www.bargaindog.com/prod/?id=4725&uid=478810">
        <font face="arial,helvetica" size=-1 color="#000066">
        <b>Sports Ball Mousepads</b></font></a>  <font face="arial helvetica"
        color="#000066" size=-1><b><s>$12.95</s></b>  <font                           1620
        color="#AA3333">$4.00</b></font><br></font>
        Give your favorite sports fan a treat with their very own personalized mouse pad. Now 69% off!
        <br><font color="#AA3333"><b>At Personal Creations</b><br></font></font></td></tr><td
colspan=3 align=center>
        <table width=100% border=0 cellspacing=0 cellpadding=0
                bgcolor="#000066"><tr><td align="center" width=100%>
        <font face="arial,helvetica" size=-1 color="#FFFFFF">
        <nobr><b>Electronics & Gadgets</b></nobr>
        </font>
        </td></tr></table></td></tr>

<tr><td colspan=3 align=center>
<a target=_blank href="http://www.bargaindog.com/prod/?id=4768&uid=478810">
        <font face="arial,helvetica" size=-1 color="#000066">
        <b>Midland 75-507 14-Channel Family Radio (Single)</b></font></a>  <font
face="arial,helvetica"
        color="#000066" size=-1><b><s>$79.95</s></b> <font
```

FIG. 16B

```
                color-"#AA3333">$19.99</b><br></font>
                This tiny, inexpensive 2-way radio packs just enough features for the casual user to make it a terrific deal.
Now 75% off!
                <br><font color="#AA3333"><b>At Amazon.com</b><br></font></font></td></tr><tr><td colspan=3
align=center>
                <table width=100% border=0 cellspacing=0 cellpadding=0
                        bgcolor="#000066"><tr><td align="center" width=100%>
                <font face="arial,helvetica" size=-1 color="#FFFFFF">
                <nobr><b>Movies</b></nobr>
                </font>
                </td></tr></table></td></tr>

<tr><td colspan=3 align=center>
<a target=_blank href="http://vvvvw.bargaindog.com/prod/?id=4767&uid=478810">
                <font face="arial,helvetica" size=-1 color="#000066">
                <b>Two Free Blockbuster Movie Rentals with $25 Purchase</b></font></a>  <font
face="arial,helvetica"
                color="#000066" size=-1><b><font
                color="#AA3333">Free!</b><br></font>
                        Now at PetsMart.com, spend $25 and receive a Blockbuster Movie Card good for 2 FREE movie
rentals!
                <br><font color="#AA3333"><b>At PetsMart.com</b><br></font></font></td></tr><tr><td colspan=3
align=center>
                <table width=100% border=0 cellspacing=0 cellpadding=0
                        bgcolor="#000066"><tr><td align="center" width=100%>
                <font face="arial,helvetica" size=-1 color='#FFFFFF">
                <nobr><b>Apparel & Accessories</b></nobr>
                </font>
                </td></tr></table></td></tr>

<tr><td colspan=3 align=center>
<a target=_blank href="http://www.bargaindog.com/prod/?id=4638&uid=478810">
                <font face="arial,helvetica" size=-1 color="#000066">
                <b>Men's Golfer Silk Tie</b></font></a>  <font face="arial,helvetica"
                color="#000066" size=-1><b><s>$26.00</s>  <font
                color="#AA3333">$19.00</b><br></font>
                This classic Renato Balestra Italian silk tie will make a winning impression on your next interview or date! Now
save 37%!
                <br><font color="#AA3333"><b>At tiemaster.com</b><br></font></font></td></tr>

<tr><td colspan=3 align=center>
        <table width=100% border=0 cellspacing=0 cellpadding=0
                bgcolor="#000066"><tr><td align="center" width=100%> <font
        face="arial,helvetica" size=-1 color="#FFFFFF"> <nobr><b>BargainDog
        Information</b></nobr>
        </font>
        </td></tr></table>
</td> </tr>

<tr><td colspan=3 align="left">

<font face="arial,helvetica" size=1 color="#AA3333">
<b>Subscription Information</b><br>
<font color="#000066">
You are subscribed to this newsletter as "psorkin@wgslaw.com".
<br>
```

FIG. 16C

To change your preferences, customize your category selections, or unsubscribe from the newsletter, please go to <a target=_blank href="http://www.bargaindog.com/members/">Our Members Page</a>.
<br><br>
</font>

<b>Disclaimer</b>
<br><font color="#000066">
This e-mail is meant for informational purposes only, and is not a guarantee that the products listed may be purchased at the above prices. BargainDog, its affiliated and non-affiliated merchants make no promises or guarantees about the price, quality or availability of products it lists in this service. For a full description of BargainDog's policies, see our <a target=_blank href="http://www.bargaindog.com/static/terms.ehtml">terms and conditions</a>.

</td></tr>
</table>

</body></html>

© 1999-2000 Sombasa media, Inc.

FIG. 16D

METHOD AND APPARATUS FOR DELIVERING CUSTOMIZED INFORMATION ACCORDING TO A USER'S PROFILE

CROSS-REFERENCE TO RELATED APPLICATIONS

This application is a continuation of U.S. patent application Ser. No. 10/862,920, filed Jun. 7, 2004, now U.S. Pat. No. 7,793,213, which is a continuation of U.S. patent application Ser. No. 09/585,511, filed Jun. 1, 2000, now abandoned.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent and files or records, but otherwise reserves all copyright rights whatsoever.

TECHNICAL FIELD

The present invention is related to providing customized information according to a user's predefined criteria or profile.

BACKGROUND

The Internet has quickly become the primary source from which many people gather information they need to make many types of decisions. Research that people have done in the past is now being done over the Internet. Because there is so much information on the World Wide Web, however, it is oftentimes difficult for an individual to gather together information relevant to the individual's interests or needs. This difficulty is due to the fact that there are so many different web sites that must be visited or accessed to obtain the information. Visiting a large number of web sites, however, is a very time intensive undertaking.

People look to the World Wide Web for information for many different reasons including accessing health or medical information, historical research, current events and sports information. Perhaps one of the most explosive areas of Internet usage is that of purchasing goods. A task that oftentimes required either traveling from one store to another in order to compare price, scanning the ads in the Sunday paper or calling by telephone (and hoping to reach an informed salesperson) has now been replaced by clicking into various web sites in order to identify the availabilities and prices of specific goods. While it person can do all of this from the convenience and privacy of his or her own home, traveling from store to store in order to determine what is on sale has been replaced by "surfing" from one web site to another web site to comparison shop.

To alleviate the drudgery of clicking from one web site to another to find the best price, programs called "shop-bots" are known. These are software programs that search the web to find the offered prices for a particular item. In operation, a user enters information about the item, e.g., brand name or model number. The shop-bot program then proceeds to search through a large number of web sites and returns with information regarding the product found from the various sites. The user then reviews the list of sites and prices that has been presented and can then access a particular web site directly.

One disadvantage of these shop-bots is that a particular shop-bot might only access sites that have paid a fee to be included in any searches that are performed. This may exclude, however, sites that have not paid but which have better prices for the particular item. A user of any particular shop-bot needs to know beforehand the inclusiveness or exclusiveness of the sites that will be searched to determine the accuracy of the results. Further, a shop-bot is only really helpful when the potential buyer knows the specific model that is desired. In a situation where the buyer is looking for a generic device without any limitations as to specific brand or model, e.g., any portable CD player, a shop-bot would either return too many results or might not be able to complete the search. A known example of such a shop-bot can be found at www.mysimon.com.

While it may be possible for a shopper to identify the best price for a particular item, this still does not address a shopper who is not necessarily actively looking for a particular item to buy but who is interested in knowing about items and their prices because an item of interest at the right price might cause the person to purchase it. Vendors would like to be able to inform potential buyers that an item is available at a certain price because the availability/price combination might be all that is necessary to entice a person to make the purchase. Of course, if the vendor cannot get the information to the buyer, then no sale will ever occur.

As an alternative to, or in conjunction with, a shop-bot that responds to a query, an individual can also sign up or register to receive a newsletter or notification of items of interest via e-mail. To tailor the newsletter to his or her interests, an individual completes a questionnaire or form that defines the individual's interests. The completed questionnaire defines the individual's profile.

After the profile is complete, it is used by the originator of the newsletter service to prepare a newsletter for delivery to the individual. As an example, the newsletter may be directed to identifying web sites that provide the goods or services that, according to the profile, are of interest to the individual.

Often, however, the individual is not receiving a newsletter that has been customized or prepared specifically for the individual. Instead, the completed profile is used to "lump" the individual into a group of individuals that, for the most part, have common interests. A single newsletter is prepared and bulk e-mailed to the group of individuals.

Providers of electronic newsletters group recipients together to send a single newsletter because preparing a single newsletter for a single user does not scale very efficiently for large numbers of individuals. As the number of recipients becomes larger, a significant amount of computing power, i.e., processors, storage devices and the like, would be necessary to generate the newsletters. If the newsletter is to be prepared in a timely manner, the equipment investment necessary for this mode of operation would be prohibitive.

Therefore, in order to provide a large number of individuals with information that has been timely prepared for each person according to his or her profile, and in a cost effective manner, a new mechanism or approach is necessary.

SUMMARY OF THE INVENTION

A system is provided that accepts a user's (i.e., a potential buyer's) profile to be used to notify that user of items for sale that are closely aligned with the user's interests. Via the Internet, a user completes a form on which various categories of products are listed. By identifying the categories and an associated level of interest in each category, a profile of that user is created and stored. Subsequently, the stored profile is compared to information regarding all of the available items and a list of items most likely of interest to the user is created. The list will identify the item, its price and where the item can be purchased.

The list is transmitted to the user as a newsletter via e-mail. As part of the recording of the user's preferences, the user can also identify how often this letter or newsletter is sent in addition to how many different bargains should be identified.

In one aspect of the present invention there is provided a computer-implemented method of providing information regarding one or more items for sale to a user. The method comprises (a) comparing a user's stored profile data to data regarding a plurality of items; (b) identifying one or more items of interest to the user from the plurality of items according to the user's stored profile data; (c) organizing the identified one or more items of interest according to the user's stored profile data; (d) formatting a document representing the identified one or more items of interest as organized in step (c); and (e) providing the formatted document to the user.

In one aspect of the present invention there is provided a method of providing information regarding one or more items for sale to a user. The method comprises, under control of a client system: (a) displaying preference information to be selected by the user; and (b) upon completion of preference selection by the user, sending the selected preference information to a first server system. In addition, under control of the first server system, (c) receiving the selected preference information; (d) storing the selected preference information; (e) comparing the selected preference information to data representing one or more items available for purchase and determining one or more items of interest to the user; and (f) sending information regarding the identified one or more items of interest to the client system.

In one aspect of the present invention there is provided a server system for providing information to a user regarding one or more items for sale. The server system comprises a first data storage device storing item information on each item of a plurality of items for sale; a receiving component for receiving user purchase preference data from a client system; a second data storage device for storing the received user purchase preference data; a list generating component for comparing, for each respective user, the respective user purchase preference data to the stored item information to generate a list of one or more items for sale that may be of interest to the respective user; and a transmission component for transmitting the generated list to the respective user on the client system.

In one aspect of the present invention there is provided a computer program product comprising a computer-readable medium. Computer program instructions, on the computer-readable medium, when executed by a computer, direct the computer to perform a method of providing information to a user regarding one or more items for sale. The method comprises: (a) comparing a user's stored profile data to data regarding a plurality of items; (b) identifying one or more items of interest to the user from the plurality of items according to the user's stored profile data; (c) organizing the identified one or more items of interest according to the user's stored profile data; (d) formatting a document representing the identified one or more items of interest as organized in step (c); and (e) providing the formatted document to the user.

In one aspect of the present invention there is provided a computer-implemented method of preparing and sending an electronic newsletter message prepared for each individual of a plurality of individuals. The method comprises: retrieving a profile associated with a first individual; identifying a newsletter template in the retrieved profile, said newsletter template having one or more variable fields each to be provided with data as a function of information in the retrieved profile; identifying an e-mail address in the retrieved profile; establishing a connection with a mail server associated with the identified e-mail address; sending the newsletter template to the mail server, and, if, as the newsletter template is being sent to the mail server, a variable field is encountered, providing data for the variable field as a function of information in the retrieved profile and sending the provided data in the place of the variable field; and continuing to send the newsletter template, wherein the newsletter template with its one or more variable fields each completed with provided data is sent to the identified e-mail address; and wherein no version of the newsletter template with one or more variable fields completed is stored other than on the mail server.

In one aspect of the present invention there is provided a system for preparing and sending an electronic newsletter message prepared for each individual of a plurality of individuals. The system comprises: means for retrieving a profile associated with a first individual; means for identifying a newsletter template in the retrieved profile, said newsletter template having one or more variable fields each to be provided with data as a function of information in the retrieved profile; means for identifying an e-mail address in the retrieved profile; means for establishing a connection with a mail server associated with the identified e-mail address; means for sending the newsletter template to the mail server, and, if, as the newsletter template is being sent to the mail server, a variable field is encountered, providing data for the variable field as a function of information in the retrieved profile and sending the provided data in the place of the variable field; and means for continuing to send the newsletter template, wherein the newsletter template with its one or more variable fields each completed with provided data is sent to the identified e-mail address; and wherein no version of the newsletter template with one or more variable fields completed is stored on the system other than on the mail server.

In one aspect of the present invention there is provided a computer program product comprising a computer-readable medium. Computer program instructions on the computer-readable medium, when executed by a computer, direct the computer to perform a method of preparing and sending an electronic newsletter message prepared for each individual of a plurality of individuals. The method comprises: retrieving a profile associated with a first individual; identifying a newsletter template in the retrieved profile, said newsletter template having one or more variable fields each to be provided with data as a function of information in the retrieved profile; identifying an e-mail address in the retrieved profile; establishing a connection with a mail server associated with the identified e-mail address; sending the newsletter template to the mail server, and, if, as the newsletter template is being sent to the mail server, a variable field is encountered, providing data for the variable field as a function of information in the retrieved profile and sending the provided data in the place of the variable field; and continuing to send the newsletter template, wherein the newsletter template with its one or more variable fields each completed with provided data is sent to the identified e-mail address; and wherein no version of the newsletter template with one or more variable fields completed is stored other than on the mail server.

BRIEF DESCRIPTION OF THE DRAWINGS

The present invention will now be described with reference to the drawings, which are intended to illustrate and not to limit the invention, and in which:

FIGS. 5A-5C are additional screen displays for entering user information;

FIGS. 6, 6A and 6B are screen displays for entering a user's relative interest information;

FIG. 7 is a screen display for recording a user's interest in a particular category;

FIGS. 8, and 8A-8C are screen displays of an electronically transmitted newsletter;

FIG. 9 is a screen display of an item "clicked-on" from the newsletter;

FIGS. 14, and 14A-14E show an HTML template that operates according to the process of FIGS. 13A and 13B;

FIG. 15 is an example of a newsletter created according to the process of FIGS. 13A and 13B; and FIGS. 16 and 16A-16D is the source for the newsletter shown in FIG. 15.

DETAILED DESCRIPTION

The present invention is directed to providing a potential buyer with information regarding products for sale, i.e., bargains, that match the potential buyer's interest. With the present invention, a potential buyer provides information regarding preferences and levels of interest in various types of merchandise. This information is stored in a database. Information regarding products for sale are also stored in a database. Of course, the preferences data and the product data could be stored in either the same database or separate databases that may be linked together.

The potential buyer's preferences are compared to the products that are available. A list of products that correlate to the potential buyer's interest is then provided to the potential buyer.

In one example of the present invention, the potential buyer provides the preference information by completing a form that is presented to the potential buyer on a client system connected to a server system via a computer network, e.g., the Internet. The information regarding merchandise that may be of interest to the potential buyer is transmitted from the server system to the client system also via the computer network for display on the client system.

Figure 1:
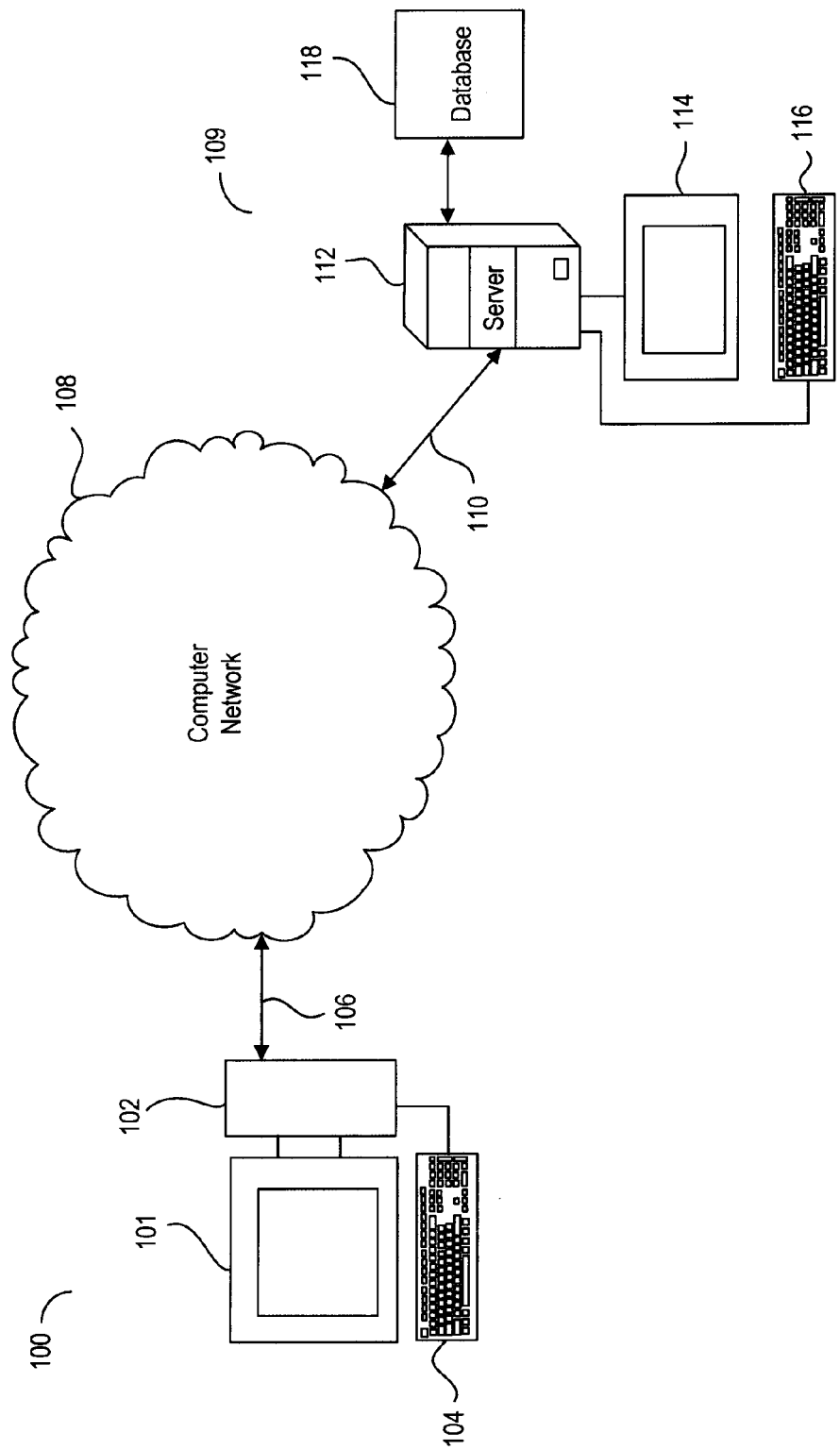
FIG. 1 is a schematic diagram of a client system and a server connected via a computer network.

As shown in FIG. 1, a client system 100 includes a display 101 connected to a processing unit 102 that includes memory and data storage and to which a keyboard 104 is connected. The client system 100 is connected to the computer network (Internet) 108 via a communications link 106. The communications link 106 can be anyone of, for example, a modem connection via a telephone line, a cable modem connection via a cable system, a wireless connection or any other medium that is known.

A server system 109 is also connected to the computer network via a communications link 110. The communications link 110 may be anyone of the connection types as described above relative to communications link 106, however, because there is typically more data flowing back and forth from the computer network 108 to the server system 109, a higher bandwidth connection such as T1 may be implemented. The server system 109 includes a server 112 connected to a database 118. Typically, the server 112 includes a processor and connected memory. Further, a display 114 and a keyboard 116 are connected to the server 112 to allow access by a web site operator.

In one example of the present invention, a user of the client system 100 will gain access to the computer network 108 and execute anyone of a number of commercially available browser programs on the client system 100 to access the World Wide Web. These browser programs include Netscape Navigator and Microsoft Internet Explorer. In a preferred embodiment of the present invention, a user of the client system 100 would direct the browser to the web site www.bargaindog.com. This web site is operated by the assignee of this application.

The server 112 of the server system 109 then transmits a web page for display on the display 101 of the client system 100. For World Wide Web applications, the page is an HTML form. Of course, any other compliant application may be used.

Figure 2:
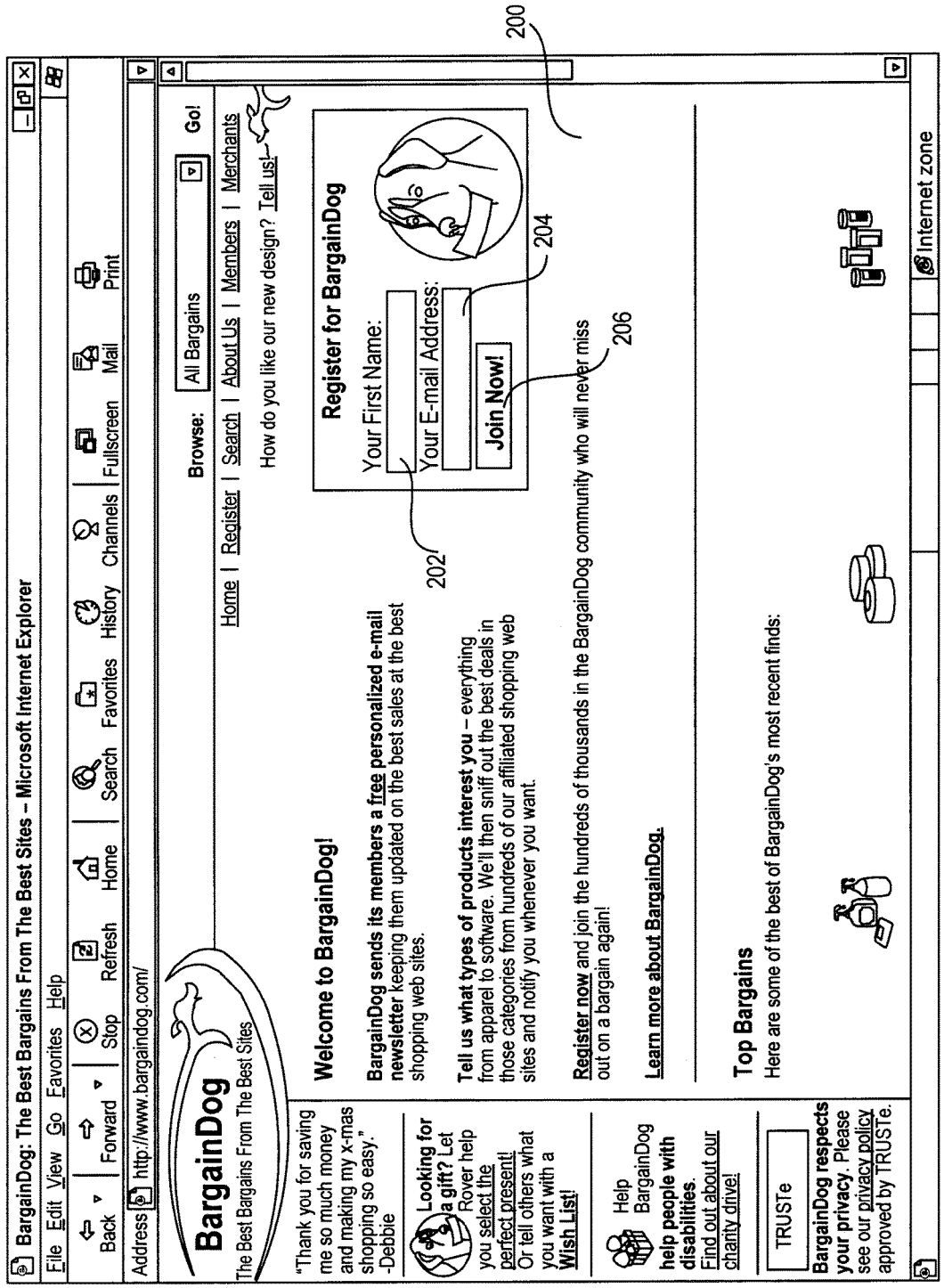
FIG. 2 is a screen display of a preliminary screen for entering user information.

When a user operating the client system 100 accesses, for example, the BargainDog.com web site, the user will be presented with an image of a home page 200 as shown in FIG. 2. The home page 200 is an HTML form that includes a name field 202 for the user to enter his or her first name and an e-mail address field 204 in which the user's e-mail address can be entered. By clicking on a "Join Now!" button 206, the user begins a registration process as will be discussed below in more detail.

Figure 3:
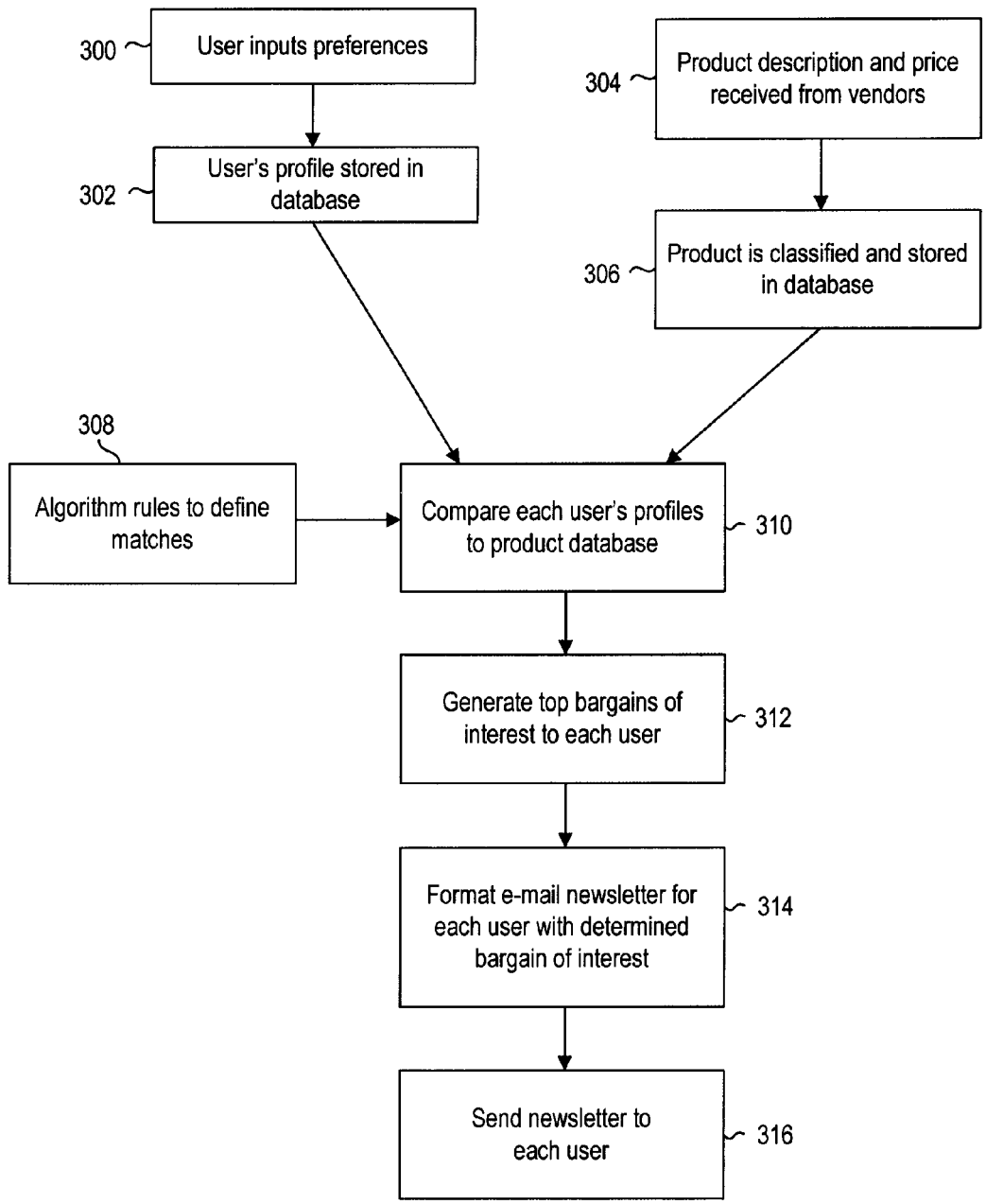
FIG. 3 is a flowchart describing operation according to an aspect of the present invention.

As already discussed above, one aspect of the present invention allows a user to define his or her shopping preferences that can be used to identify products of interest to the user. A flowchart of the steps implemented by one example of the present invention is presented in FIG. 3.

In step 300, a user inputs preferences regarding different categories of goods. The user's profile is stored in a database in step 302. Separately from the user inputting preferences, product descriptions including, e.g., manufacturer, model number, brief description, vendor name/location/web-site and price, are received from vendors in step 304. Each product is classified and stored in the database at step 306. The storing and classification of the products is transparent to the user's interaction with the web site.

The classification may involve providing the product with codes that identify attributes that can be used when compared to the individual's stored criteria. For example, and not one that is intended to be limiting, the product may be classified as to which gender the product applies, e.g., men's pants, the area, say, golf pants and the extent of the discount, for example, 45% off list price.

In step 308, algorithm rules to define matches between a user's shopping preferences and the products are defined. This algorithm controls the determination of which product or products match a user's shopping preferences. The criteria for matching a user's profile to the data in the database is easily definable by one of ordinary skill in the art.

In step 310, each user's shopping preference profile is compared to the products in the database. The most relevant bargains or products of interest to each user are then generated in step 312. Subsequently, at step 314, an e-mail newsletter is formatted for each user with a description of the top bargains generated in step 312. The newsletter is formatted to place the most relevant products in a prominent location in the newsletter. Finally, in step 316, the newsletter describing the bargains identified as being of interest to the user is sent to each user via e-mail. The preparation and sending of the newsletter will be discussed in more detail below.

The interaction between a user on the client system 100 and the web site on the server system 109 is accomplished via the computer network 108 and through the use of web pages provided by the web server and displayed on the display 101 of the client system 100. The user's information with respect to e-mail address and shopping preferences is provided to the server system 109 by having the user enter data in the blank fields and transmitting the HTML documents with the completed fields back to the server system 109.

The presentation of web pages by the server system 109 to the client system 100, in one example, is accomplished by the presentation of documents formatted with HyperText Mark up Language (HTML). Of course, any similar mechanism for allowing a user to submit information by completing a form can also be used.

The home page 200, as presented in FIG. 2, allows a user to register by submitting a first name arid e-mail address through an action of clicking on the "Join Now!" button 206.

Figure 4:
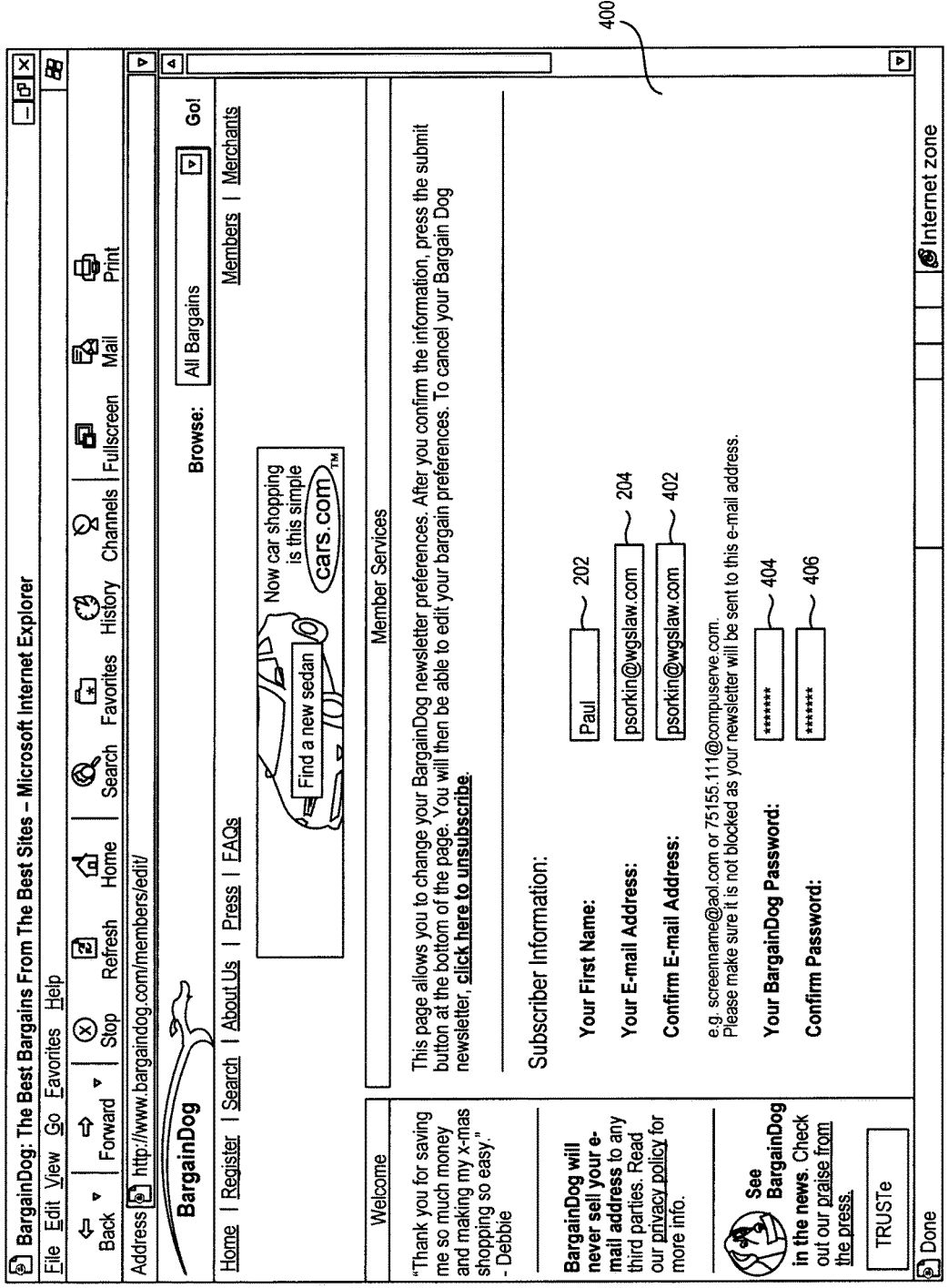
FIG. 4 is a screen display of an initial screen for entering user information.

When the user has clicked on the button 206, a screen similar to a screen 400 as shown in FIG. 4 is presented. The screen 400 includes, in a Subscriber Information section, the first name field 202 and the e-mail address field 204 as already filled in by the user. In addition, the user is prompted to confirm the e-mail address entered in the e-mail address field 204 by retyping it in an address confirmation field 402. In order to preserve a user's privacy and to prevent another from changing a user's profile without authorization, the user is prompted to provide a password in password field 404 and then to confirm the password in a password confirmation field 406.

As shown in FIG. 5A, a next portion 500 of the subscriber information form is presented. As can be seen, the password field 404 and password confirmation field 406 are shown because the screen 500 represents the "scrolled down" portion from that which is shown in FIG. 4. Here the user chooses the format for the newsletter reporting the items of interest. The user may choose either HTML enhanced 502 or text only 504 formats.

Figure 5B:
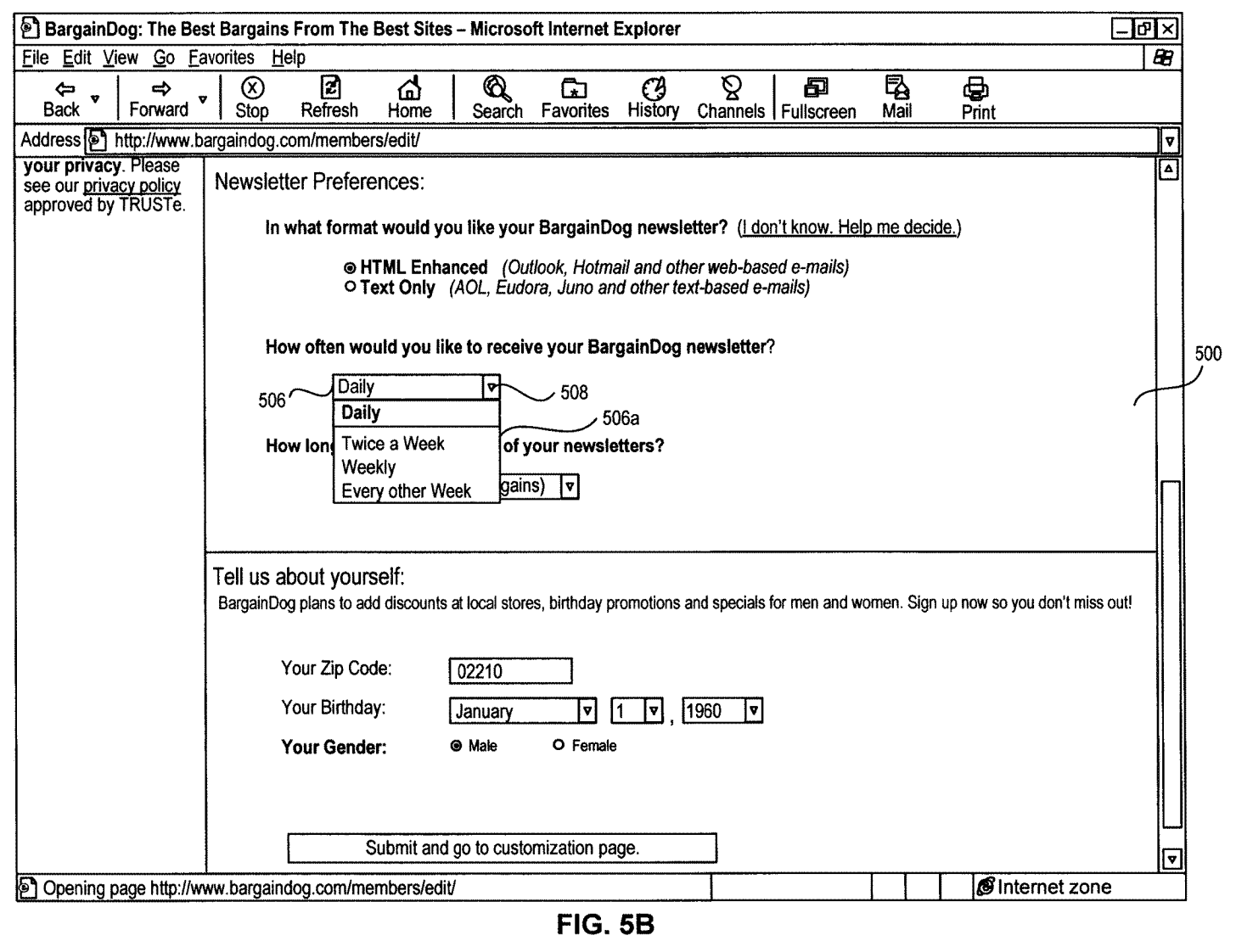

The user then chooses how often to receive the newsletter regarding items of interest by completing the field 506. In one example of the present invention, if a user clicks on the down arrow component 508 of the field 506, the available frequencies for which the newsletter may be received will be presented in field 506a as shown in FIG. 5B. Thus, the user only has to highlight one of the four choices presented in field 506a to choose how often to receive the newsletter.

Figure 5C:
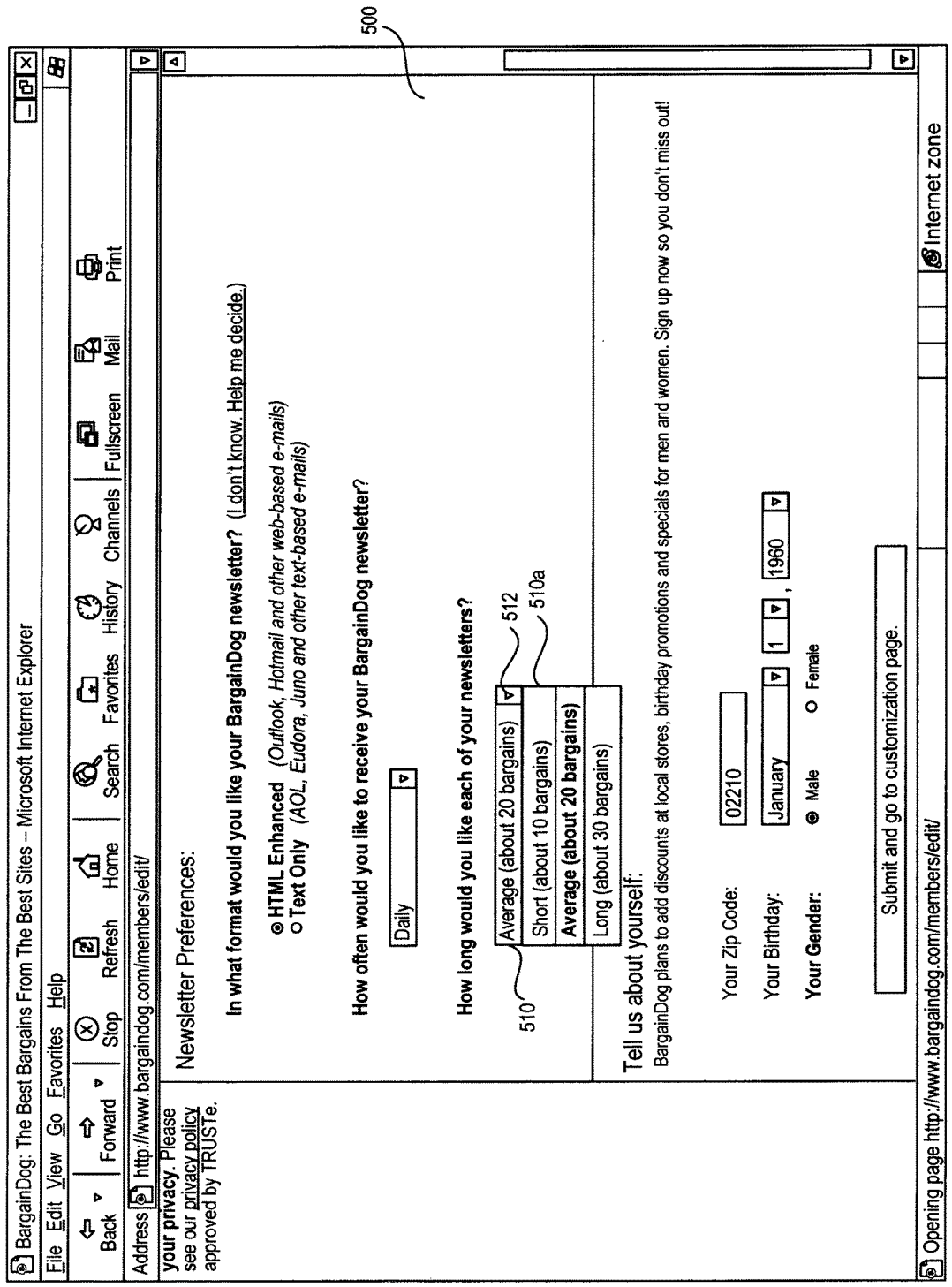

Returning to FIG. 5A, the user also may choose how long the newsletter will be, i.e., how many items of interest will be reported. This selection is accomplished by choosing from the options presented in field 510. By clicking on the down arrow 512, the user is presented with the choices as to the length of the newsletter in field 510a as shown in FIG. 5C.

Some amount of personal information also may be entered by the user. Specifically, the user's zip code is entered in zip code field 514, the user's birthday is entered in fields 516a, 516b and 516c while the user's gender is identified by choosing either field 518 or field 520.

Once the foregoing fields are completed, a user clicks on a "Submit and go to customization page" button 522 to proceed to a next stage of user preference registration.

The user will then next be presented with a screen 600, as shown in FIG. 6A, showing a matrix 601 with different categories of products listed in horizontal rows and intersecting vertical columns describing various levels of interest.

As can be seen, there is an "Apparel & Accessories" category 602, a "Career & Professional" category 604 and a "Cooking & Food" category 606 among the listed categories. There are five levels of interest, one of which may be chosen by the user for each category of goods. Specifically, as shown in the matrix 601 there is a "Not Interested" level 608, a "Somewhat Interested" level 610, an "Interested" level 612, a "Very Interested" level 614 and an "Extremely Interested" level 616. In addition, by checking a box in a "Further Customize?" column 618, a user may refine his or her level of interest in the respective category of goods. This will be discussed in more detail below.

As an example shown in the matrix 601 displayed in FIG. 6A, a user has chosen the "Interested" level 612 for the "Apparel & Accessories" category 602 and has chosen to further customize information regarding this category by checking the box in the "Further Customize?" column 618 associated therewith. Further, the user has indicated that he' or she is somewhat interested in the "Career & Professional" category 604 but does not want to further customize any information with respect to this category because the box has not been checked. With respect to the "Cooking & Food" category 606, the user has indicated no interest in this category.

Figure 6B:
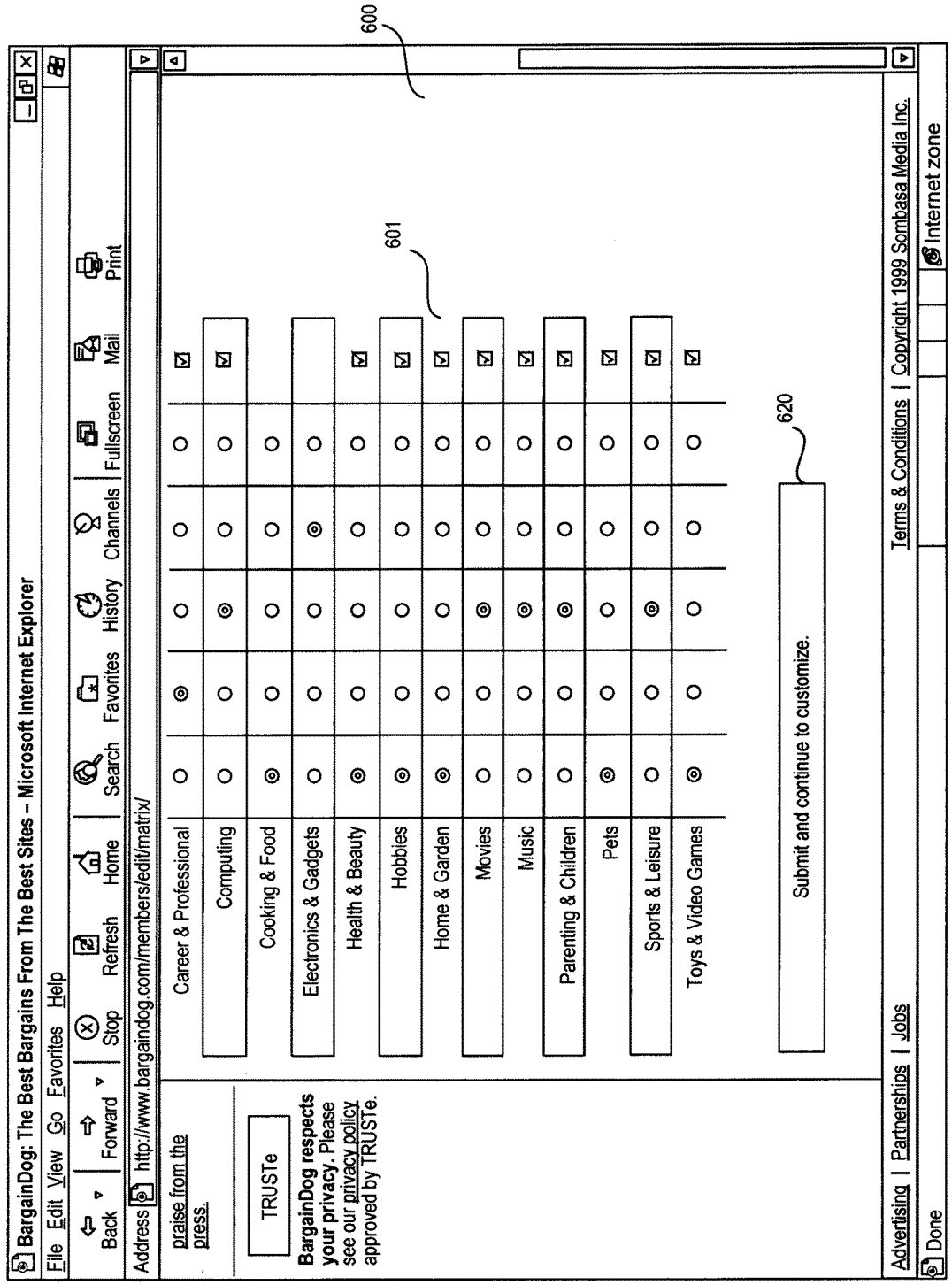

Once the user has chosen a level of interest for all of the categories, or accepted the default settings, as shown in FIG. 6B, by clicking on a "Submit and continue to customize" button 620, the next level of customization is started.

Figure 7:
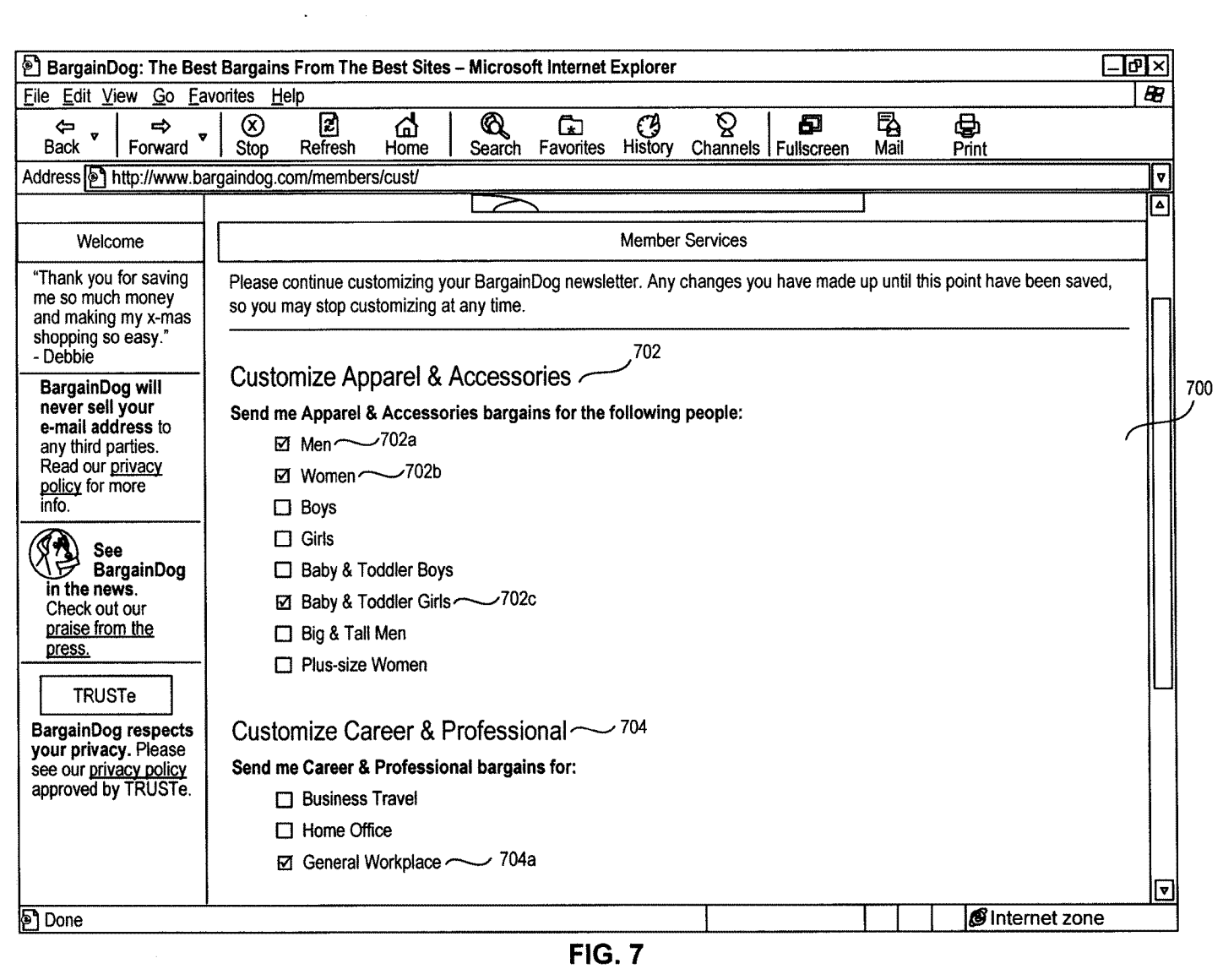

The user is then presented with a screen 700, as shown in FIG. 7, where further information for those categories as identified in FIGS. 6A and 6B may be provided. As a representative example, the "Apparel & Accessories" category 602 is presented in a "Customized Apparel & Accessories" area 702. As shown, this particular example of customization includes refining the "Apparel & Accessories" category to include men 702a, women 702b and baby and toddler girls 702c. Similarly, a "Customize Career & Professional" area 704 is presented where. more detailed information includes the choice of general workplace information 704a. Those other categories identified in FIGS. 6A and 6B as requiring further customization would be similarly refined.

Depending on the frequency chosen by the user, a list of bargains of interest to the user is generated and electronically transmitted to the user as a newsletter. The process of preparing the newsletter will be discussed in more detail.

The list of bargains of interest for the user is sent as a newsletter via e-mail to the user. Advantageously, the present invention is capable of sending a large number of these individually prepared newsletters without needing to use valuable resources to store the newsletter prior to sending. This allows a system operating the present invention to avoid the necessity, and therefore the costs, of storage devices such as hard disk drives and computer processing resources.

Figure 13A:
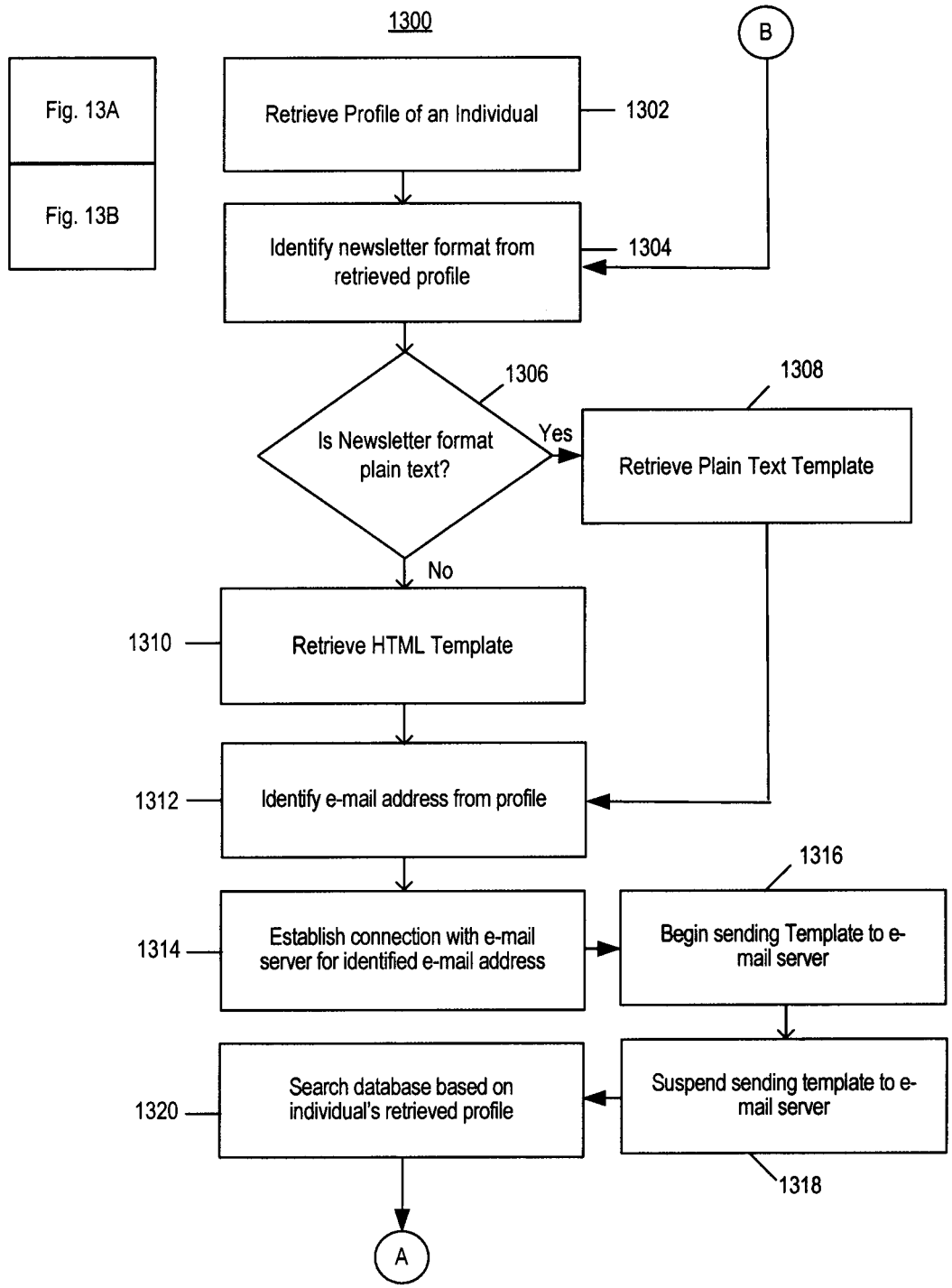
FIGS. 13A and 13B show a flowchart describing the populating of a newsletter with data.
Figure 13B:
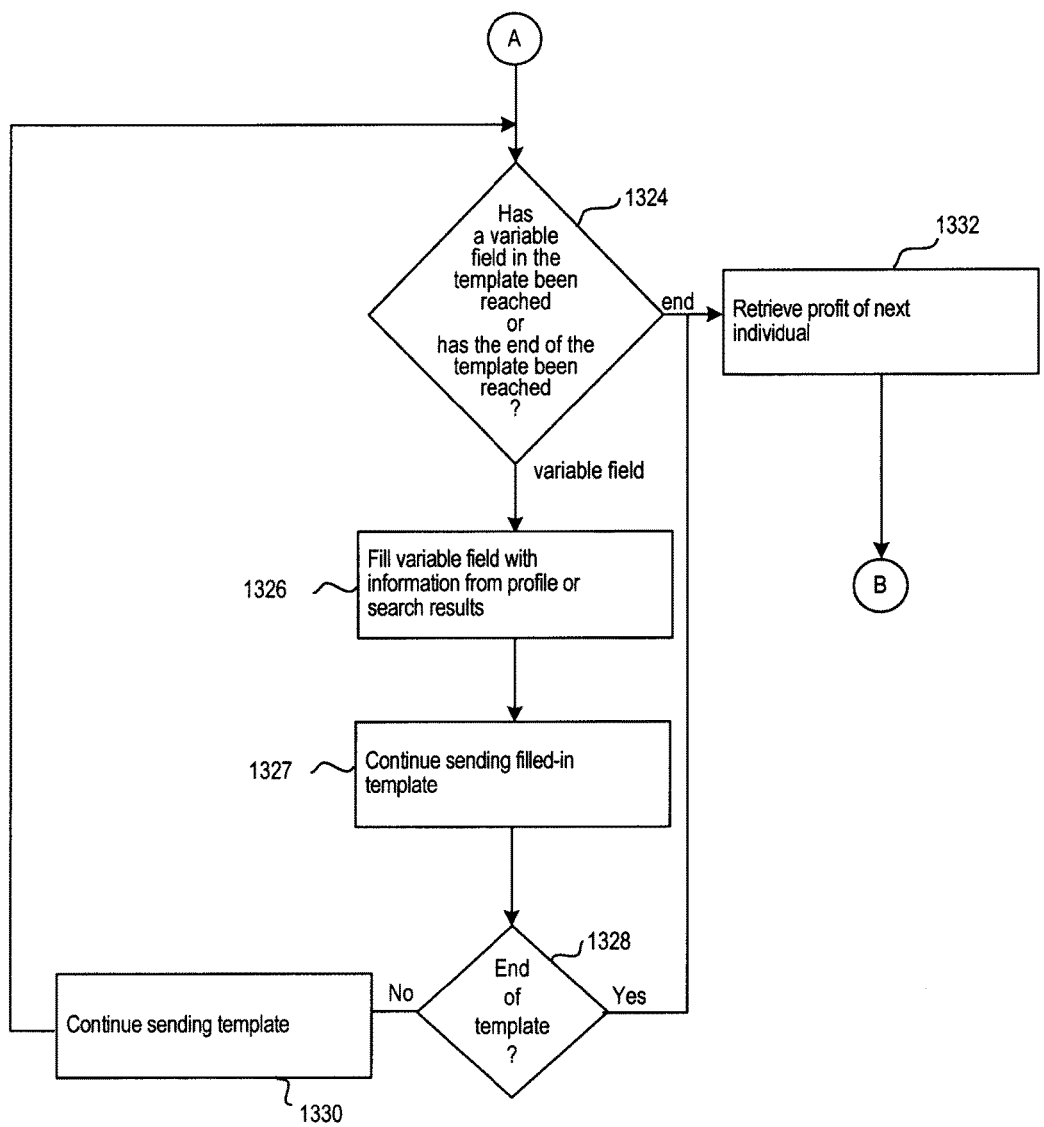

The present invention operates to prepare the newsletter generally according to the flowchart 1300 as shown in FIGS. 13A and 13B. As shown, in step 1302 the previously stored profile of an individual is retrieved. From that profile, step 1304, a newsletter format for the individual is retrieved. In one example of the present invention, two types of newsletter format are available: HTML format and plain-text. At step 1306 it is determined whether the newsletter format is plain-text. If the format is plain-text then at step 1308 the plain-text template is retrieved. If, on the other hand, the newsletter format for the individual is not plain text then at step 1310 the HTML template is retrieved. Subsequent to the retrieval of either the HTML or plain-text template, at step 1312, the e-mail address of the individual is retrieved from the profile. At step 1314, a connection is established with the e-mail server for the identified e-mail address of the individual. This connection is established through conventional mechanisms that are not considered an aspect of the present invention. At step 1316, the system begins sending the template to the e-mail server. At step 1318, a point in the template is reached causing the suspension of the sending of the template to the e-mail server.

Subsequent to the suspension, at step 1320, a search of the database based on the retrieved individual's profile is begun to identify those items in the database that will be of interest to the individual. Once the items are identified, at step 1322 the system resumes sending the remainder of the template to the e-mail server. As will be discussed in more detail below, the template comprises variable fields that are filled with information identified by the search conducted in step 1320.

At step 1324, a determination is made as to whether a variable field in the template has been reached or the end of the template has been reached. If a variable field has been reached then, at step 1326, the field is filled with the appropriate data from the search conducted at step 1320 and sent to the e-mail server, step 1327. At step 1328 a determination is made as to whether or not the end of the template has been reached. If the end of the template has not been reached then at step 1330 the system continues to send the template and control returns back to step 1324. If the end of the template has been reached either at step 1328 or at step 1324 then control passes to step 1332 where the profile of the next individual is retrieved with the process returning to step 1304 to begin the preparation of the transmission of a next newsletter to a next individual.

The present system populates the e-mail newsletter with information for the user while the newsletter is being sent. This preparation occurs "on the fly" and allows the present invention to customize the newsletter for the individual according to his or her profile without having to first generate the newsletter as a document, store the document, connect with the individual's e-mail server, send the newsletter, delete it and then repeat these steps for each individual. The present invention does not dedicate storage for holding the newsletter prior to it being sent.

As shown in FIGS. 14 and 14A-14E, an example of an HTML template includes: code 1400 for creating an HTML formatted newsletter that is sent as an e-mail message. As shown at element 1402 the template identifies the sender of the newsletter and at element 1404 the addressee field is a variable that is retrieved from the database. The lines of code between lines 1406 and 1408 in FIG. 14B generate the ranked items of interest for the individual according to his or her criteria as defined in the stored profile.

Once the bargains for the particular user have been identified and prioritized, the subsequent lines of HTML code in the HTML template format and present the information in the newsletter. It should be noted that the text template operates similarly to the HTML template. An example of the template that prepares a plain-text newsletter is presented in Appendix A.

In one example of formatting the newsletter, the top three items of interest are presented and displayed to the individual across the top of the newsletter. As described below, each of these items includes a small graphic image representing the item in addition to a relatively detailed description. The remaining items are presented by category without, however, a graphic image being provided.

FIG. 15 represents an example of an HTML formatted newsletter received by a user of the present invention. As can be seen, hyperlinks 1502, 1504 and 1506 represent the top three items identified for this particular user on this particular date. Each of these items includes a small graphic image and a written description of the item. A hyperlink is an element in an electronic document that links to another place in the same document or to an entirely different document. Typically, a user clicks on the hyperlink to follow the link. Typically the hyperlink is an implementation of a Uniform Resource Locator (URL). A URL is a standard way that has been developed to specify the location of a resource that is available electronically. A URL is most commonly used when using a World Wide Web (WWW) client to link to WWW pages. The first part of the URL identifies the protocol that is being used. Typically, in WWW applications, the HyperText Transfer Protocol (HTTP) is commonly used. The remaining hyperlinks 1508, 1510, 1512 and 1514 are presented under their respective category heading but do not include a graphic representation of the item as compared to the formatting in which hyperlinks 1502-1506 are presented. The operation and functionality of these HTML formatted newsletters has been discussed above.

The HTML source for the HTML newsletter as shown in FIG. 15 is presented in FIGS. 16 and 16A-16D. The source as presented in FIGS. 16 and 16A-16D resulted from the operation of the previously described HTML template when run for this particular user on the particular date identified.

As shown in FIG. 16A, portion 1602 is a URL that represents the graphic image portion of hyperlink 1502. Similarly, portions 1604 and 1606 are URLs that refer to the graphic portions of hyperlinks 1504 and 1506, respectively. Further, portions 1608, 1610 and 1612 represent the display of the respective prices for hyperlinks 1502, 1504 and 1506. Portions 1614, 1616 and 1618 represent the formatted information for the portions 1502, 1504 and 1506, respectively.

The remaining items of interest are also identified in the HTML source for the newsletter. One example is the portion 1620 which corresponds to hyperlink 1508 and its description. One of ordinary skill in the art of HTML coding will understand how the remainder of the HTML newsletter is formatted by reviewing FIGS. 16A-16D in comparison to the newsletter represented in FIG. 15.

The interaction of the recipient with an example newsletter listing items of interest will be discussed with reference to FIGS. 8A-8C. This newsletter is sent via e-mail to the e-mail address that the user entered in e-mail address field 204 upon submitting his or her preferences. The newsletter includes descriptive hyperlinks to the three items which are identified by the system, step 312, as being of the most interest to this particular user.

Figure 8A:
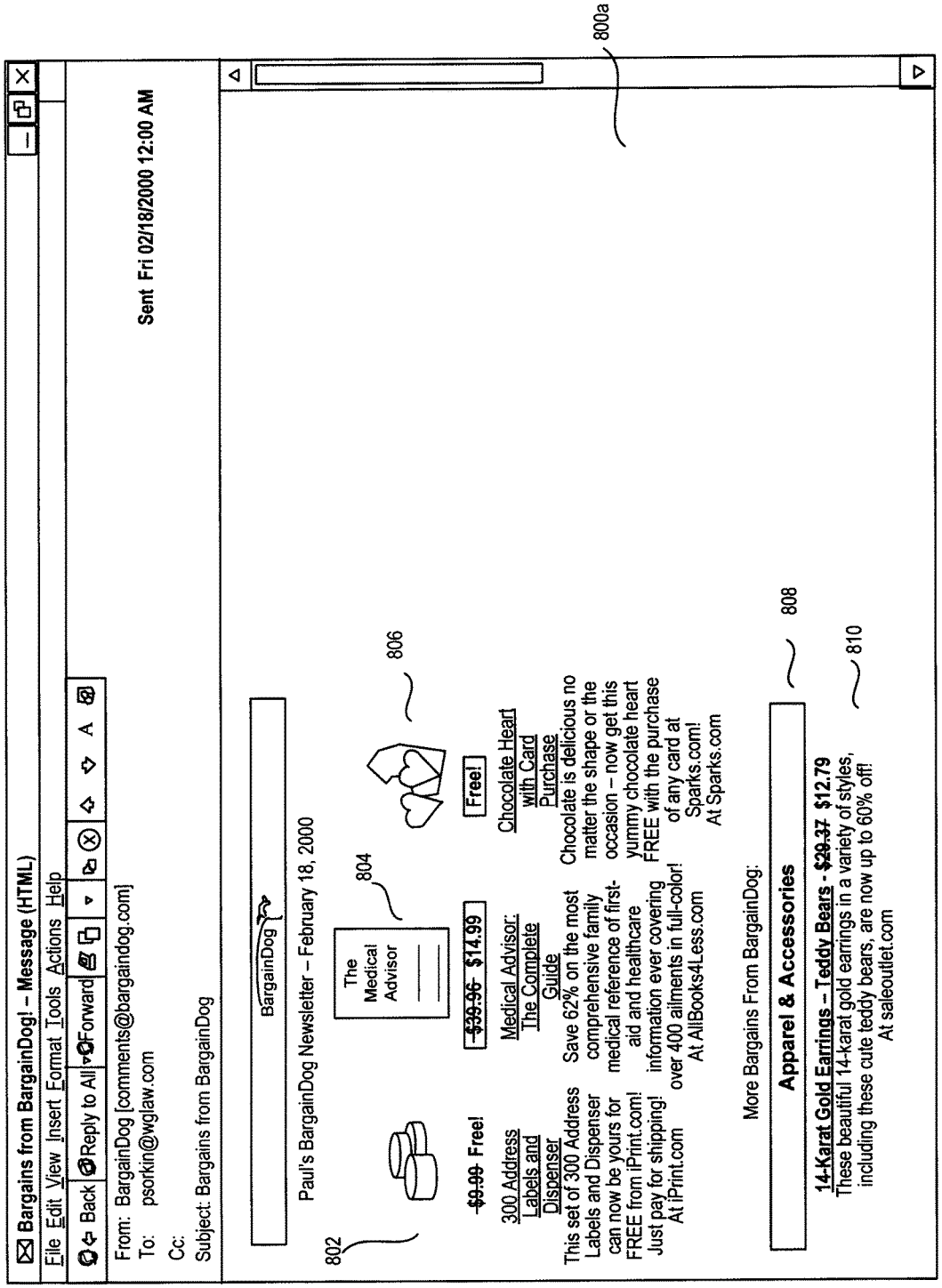
Figure 8B:
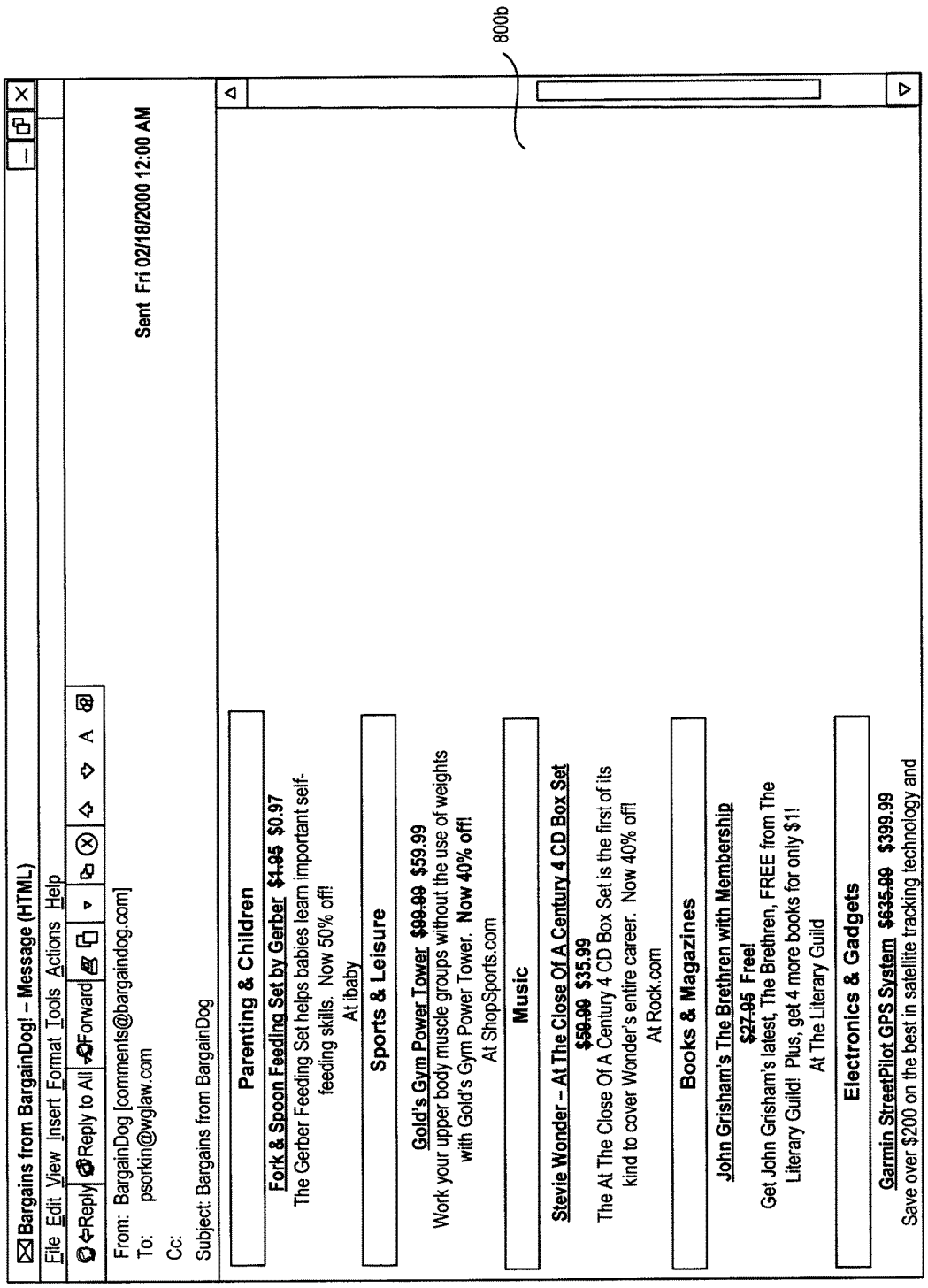
Figure 8C:
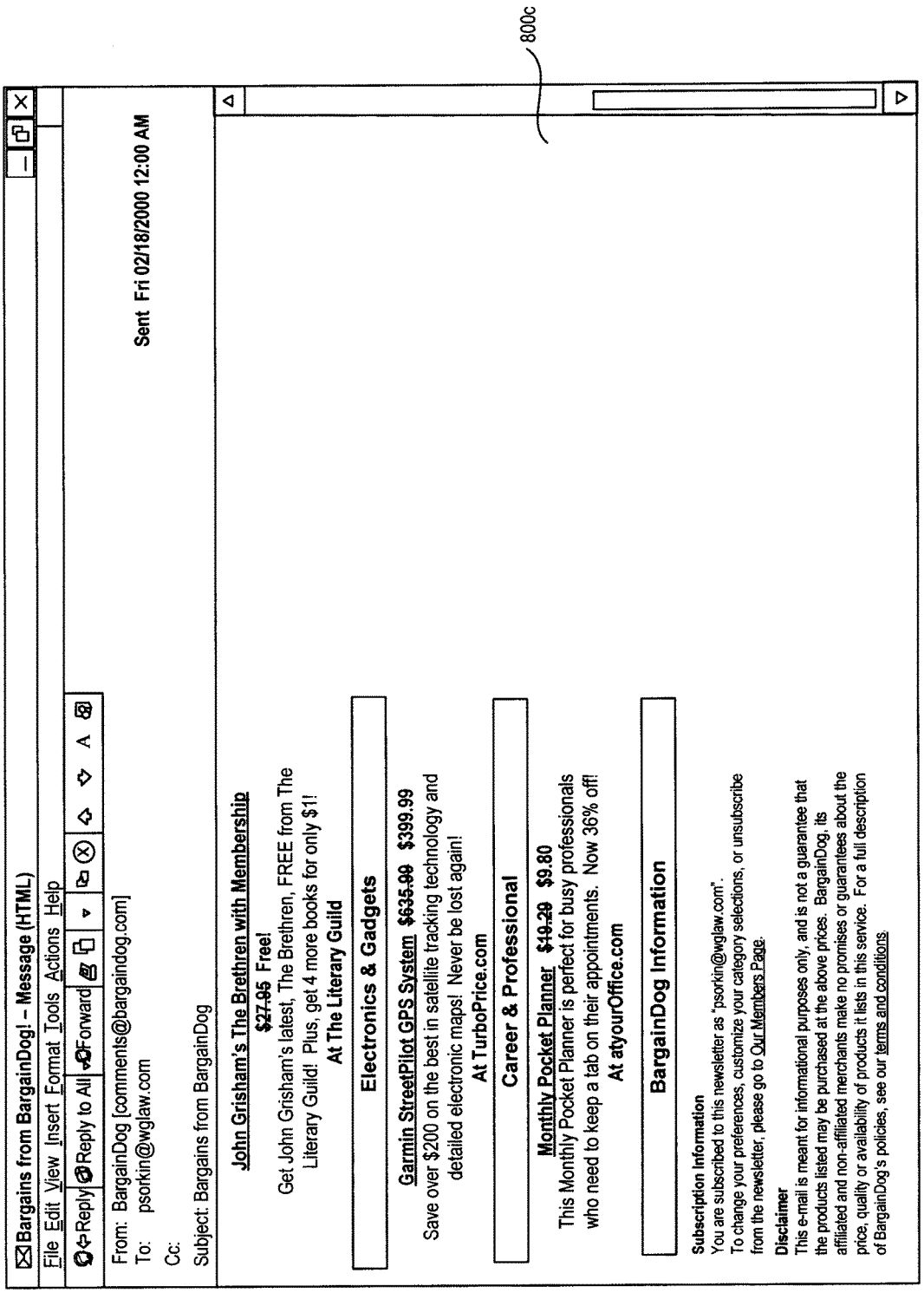

As an example shown in FIG. 8A, there is a first hyperlink 802 describing address labels and a dispenser, a second hyperlink 804 to a book on family medicine and a third hyperlink 806 to a free chocolate heart with card purchase. Additional items of interest to the user are presented by category. The first category is described by the "Apparel & Accessories" label 808 and includes a fourth hyperlink 810 to 14-Karat Gold Earrings. FIG. 88 shows a display 800*b* that is the next screen down from the display 800*a* as shown in FIG. 8A. As can be seen in FIG. 88, additional categories and hyperlinks to items within the categories are also displayed.

Returning to FIG. 8A, one example of the present invention provides pictures of the top three items in the hyperlinks 802, 804 and 806, whereas the remaining hyperlinks are only textual descriptions. It should be noted that the hyperlink is accessed by the user clicking on either the graphic image portion or the underlined text. As is known, typically, when the user positions the arrow cursor over a hyperlink, the cursor turns into a hand image indicating a WWW page or document may be accessed.

Figure 9:
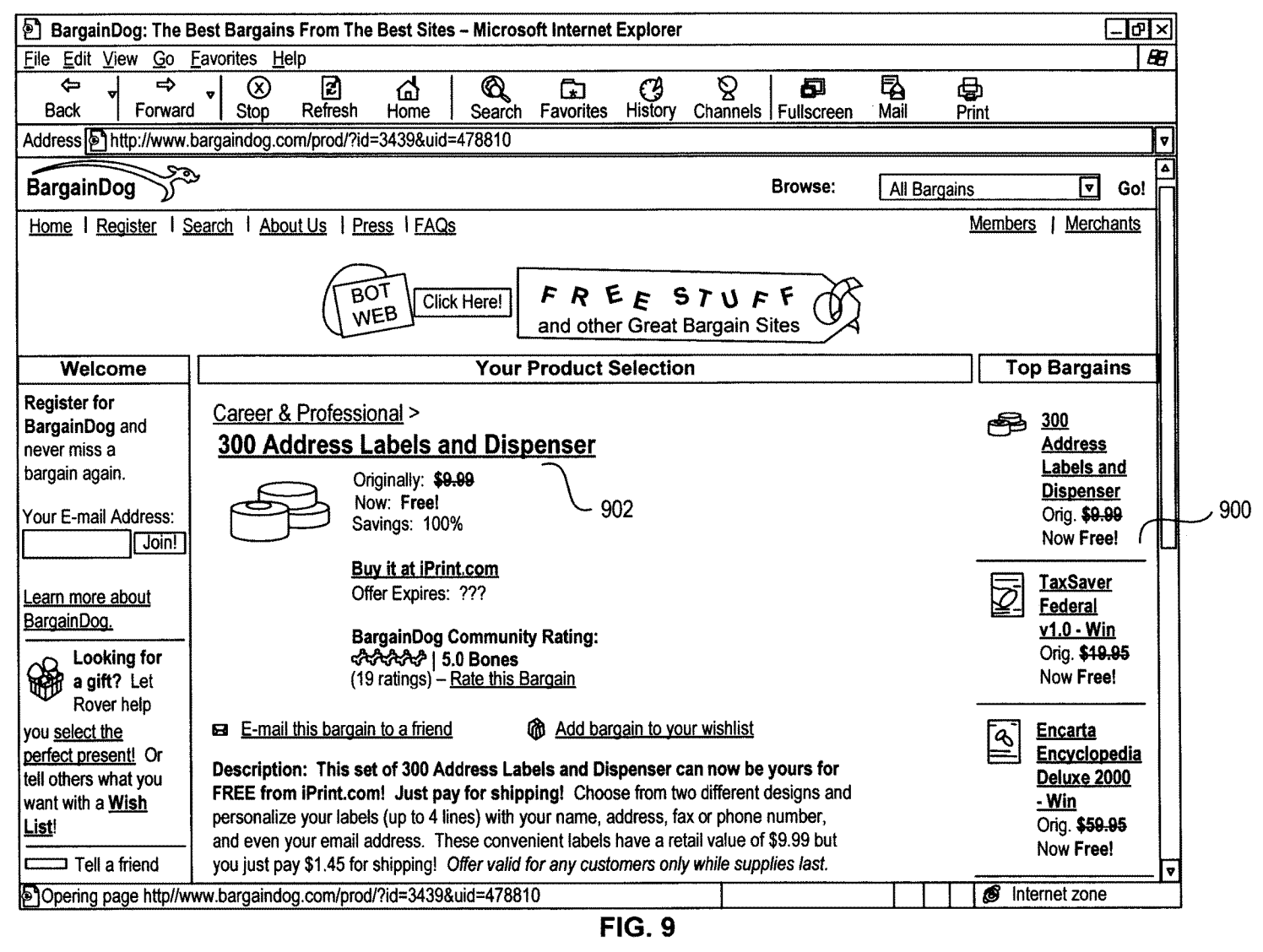
Figure 10:
FIG. 10 is a screen display of the item of FIG. 9 as found at a vendor's web site.

When a user receives the newsletter and has an interest in one or more of the items described therein, the user may obtain additional information by clicking on the particular hyperlink. As an example, if the user were to click on the first hyperlink 802, he or she would be directed to additional information about this item in the form of another screen 900, i.e., an HTML document, as shown in FIG. 9. As can be seen, additional information regarding the address labels and dispenser is presented. Another hyperlink 902 is displayed in the screen 900. This information resides on the server system 109 although, in an alternate example, the information may be residing on a different server. Screen 900 includes another hyperlink 902 directed to the vendor of, in this case, the address labels and dispenser. When the user clicks on the hyperlink 902, he or she is then directed to the web site of that particular vendor, as shown in FIG. 10.

At this point, the user has been directed to the vendor of the item of interest. The user may then proceed to order the item by transacting with that vendor.

It is noted that often items are only available for certain prices for a set period of time. After the set period of time, the offer "expires." The present invention provides for notification of this expiration via the already-delivered newsletter.

Figure 11:
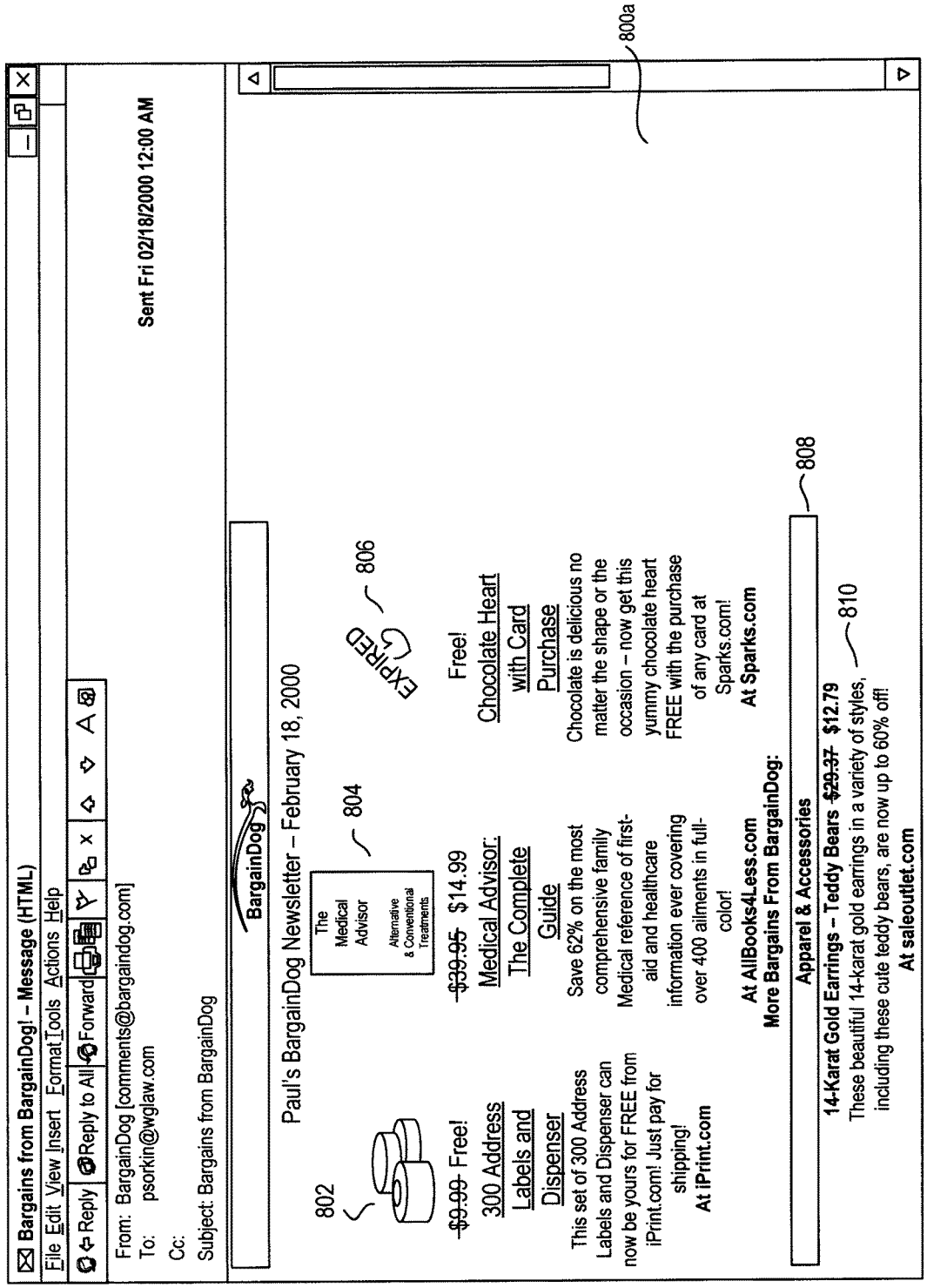
FIG. 11 is a screen display of the electronically transmitted newsletter as shown in FIG. 8A where an offer has expired.

Screen display 800*a*' as shown in FIG. 11, represents a later version of the screen display of the newsletter previously discussed in FIG. 8A. As can be seen, one of the items has expired, represented by a link 806'. As discussed above, a hyperlink is used to point to the URL of the information displayed for hyperlink 806. As a result, the base reference, i.e., the content of the document or web page that the hyperlink points to can change.

The hyperlink (URL) embedded in the newsletter does not change, i.e., it is pointing to the same location, however, the content at that location has changed. Consequently, at a time subsequent to the first time the recipient views the newsletter he or she will see different information. Specifically, the information at the URL target location can be updated and provided to the recipient without having to send another newsletter. As a result, in the particular example shown in FIG. 11, a user who views the newsletter some time after it has been initially received will be notified that the item is no longer available at that price.

Figure 12:
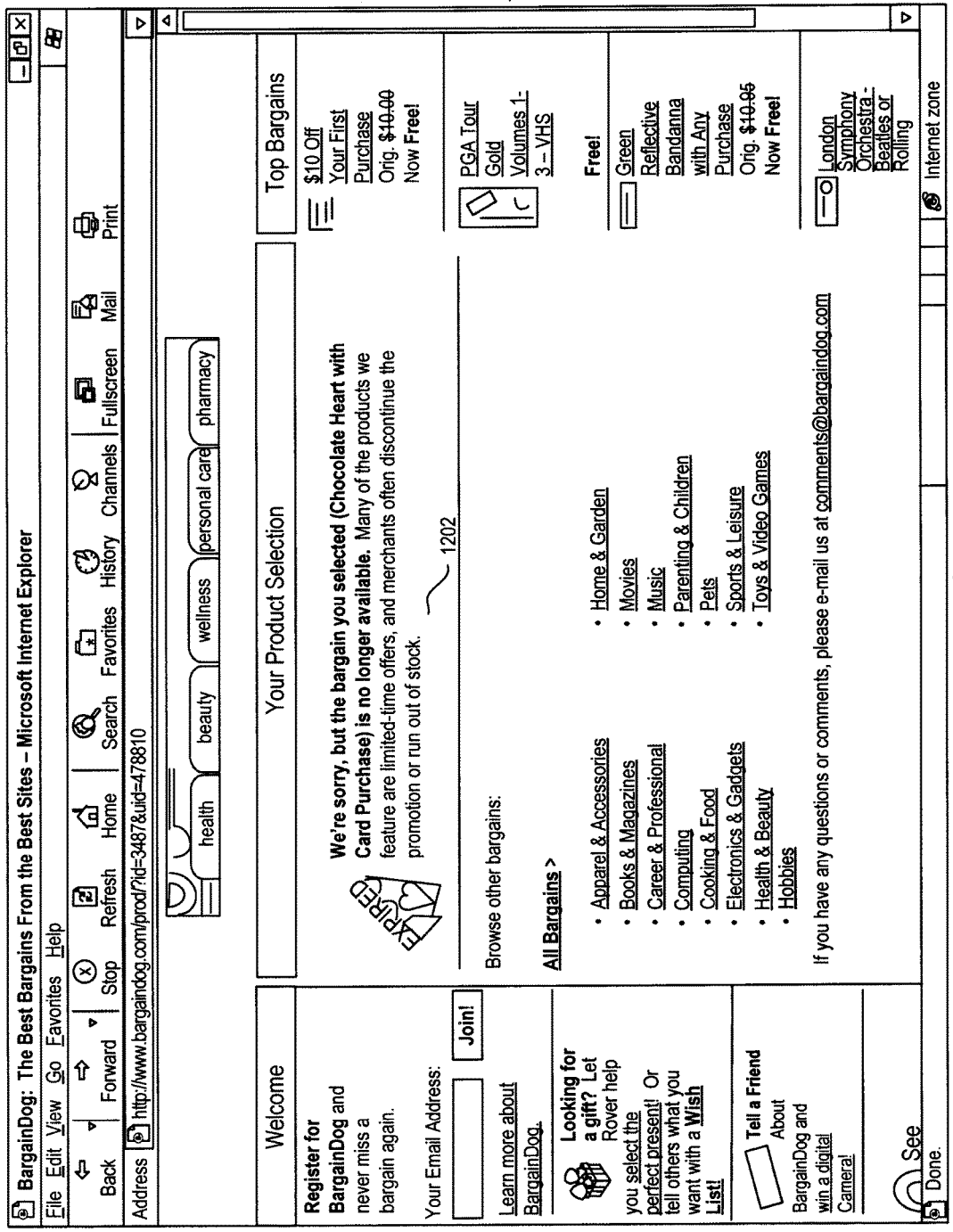
FIG. 12 is a screen display shown when the expired link has been accessed.

If a user clicks on the "expired" link, he or she may be directed to an explanatory screen 1200, as shown in FIG. 12. A section 1202 then explains that the selected items is no longer available.

The present invention provides a system and method that allows a user to define the types of products that the user may be interested in purchasing, the relative level of interest in each category and the types of products. This information is stored and regularly compared to information regarding products that are available. By comparing the user's preferences to the products that are available, a more targeted list of products may be provided to the individual. With this system, the individual will receive information regarding products that he or she is more likely to be interested in and, therefore, more likely to purchase. Advantageously, the user is not barraged with information regarding products in which he or she has very little or no interest. Advantageously for a seller, those potential buyers who have already expressed an interest in a particular product will be receiving information about the products and the advertising or information about the products is targeted to buyers who are more likely to make a purchase.

Of course, the profile and database containing the product information may be resident on a system separate from, but linked to, the server system 109. Specifically, the mail server and the database used to prepare and send the newsletter may be a machine separate from a web server that services the web site. The newsletter generating system, in one example, is a dual-processor machine with two 700 MHz Pentium III processors and 512 megabytes of RAM. The system uses the Red Hat Linux operating systems and the MySQL database. Of course, these particular components could be substituted with known equivalents.

The present invention scales up very efficiently for when large numbers of newsletters must be prepared and delivered. In operation, the present invention achieves a throughput rate of approximately 150,000 e-mail newsletters delivered each hour on a single double-processor machine. This compares very favorably with a maximum throughput of not more than 10,000 e-mails on the same single double-processor system using the conventional prepare/store/send/delete methodology.

Further, additional information may be provided to the recipient of the newsletter by modifying the content of target of one of the links embedded in the newsletter. In this manner, the individual is updated without the necessity of sending an additional newsletter. Advantageously, this aspect of the present invention overcomes the disadvantages of a "static" e-mail message that cannot be modified without sending a new e-mail message some time after the first e-mail message.

While one example of the present invention involves a preparation of a newsletter describing items for sale that may be of interest to an individual, it is certainly clear to one of ordinary skill in the art that the present invention is not limited to the subject matter of items for sale but can provide any type of mass individualized message preparation.

Unless specifically stated herein, it should not be assumed that any described particular aspect or element of the system is essential. Further, variations, modifications, and other implementations of what is described herein will occur to those of ordinary skill in the art without departing from the spirit and the scope of the invention as claimed. In addition, in view of the foregoing description, one of ordinary skill in the art will understand that equivalent structures may be available to achieve the same results as those described above. Accordingly, the spirit and scope of the following claims should not be limited to the descriptions of the examples described herein.

What is claimed is:

1. A computer-implemented method of preparing and sending an electronic newsletter message prepared for each individual of a plurality of individuals, the method comprising:
    retrieving a profile associated with a first individual, wherein the profile comprises one or more preferences and a corresponding level of interest for each preference;
    identifying a newsletter template associated with the retrieved profile, said newsletter template having one or more variable fields;
    identifying an e-mail address associated with the first individual from the retrieved profile;
    establishing a connection with a mail server associated with the identified e-mail address;
    initiating transmission of the newsletter template to the mail server, wherein the newsletter template comprises a first portion and one or more second portions;
    receiving the first portion of the newsletter template at the mail server;
    suspending the transmission of the one or more second portions of the newsletter template, wherein during the suspension comprises:
        searching, at a database, product information from one or more product providers associated with the newsletter;
        determining at least a portion of the product information that matches the profile associated with the first individual, wherein the determination is performed by applying algorithm rules in order to compare, based on matching criteria, the product information and the profile associated with the first individual;
        determining a relevancy level associated with the matching portion of the product information based on the preference and the corresponding level of interest associated with the matching portion of the product information; and
        obtaining, from the database, information to be populated in the variable field, wherein the information is associated with the first individual based on determining the matching product information;
    resuming transmission of the one or more second portions of the newsletter template, wherein during the transmission comprises:
        upon detection of a variable field in the one or more second portions of the newsletter template, populating the variable field in the newsletter template with the obtained information; and
        formatting the newsletter template, wherein the formatting comprises placing the matching portion of the product information in a predetermined location of the newsletter template based on the determined relevancy;
    determining whether the end of the newsletter template has been reached; and
    continuing the transmission of the one or more second portions of the newsletter template to the mail server until determining that the end of the newsletter template has been reached,
    wherein no version of the newsletter template with one or more variable fields completed is stored other than on the mail server associated with the first individual.

2. The computer-implemented method of claim 1, wherein the newsletter template is an HTML document.

3. The computer-implemented method of claim 1, wherein the newsletter template is a text document.

4. The computer-implemented method of claim 1, wherein at least one of the variable fields in the newsletter template is provided with data that is a Uniform Resource Locator (URL) link.

5. A system for preparing and sending an electronic newsletter message prepared for each individual of a plurality of individuals, the system comprising:
    at least one memory containing data and instructions;
    one or more computer processors configured to access the at least one memory and execute the instructions, causing the one or more processors to:
    retrieve a profile associated with a first individual, wherein the profile comprises one or more preferences and a corresponding level of interest for each preference;
    identify a newsletter template associated with the retrieved profile, said newsletter template having one or more variable fields
    identify an e-mail address associated with the first individual from the retrieved profile;
    establish a connection with a mail server associated with the identified e-mail address;
    initiate transmission of the newsletter template to the mail server, wherein the newsletter template comprises a first portion and one or more second portions;
    receive the first portion of the newsletter template at the mail server;
    suspend the transmission of the one or more second portions of the newsletter template, wherein during the suspension further causing the one or more processors to:
        search, at a database, product information from one or more product providers associated with the newsletter;
        determine at least a portion of the product information that matches the profile associated with the first individual, wherein the determination is performed by applying algorithm rules in order to compare, based on matching criteria, the product information and the profile associated with the first individual;
        determine a relevancy level associated with the matching portion of the product information based on the preference and the corresponding level of interest associated with the matching portion of the product information; and
        obtain, from the at least one memory, information to be populated in the variable field, wherein the information is associated with the first individual based on determining the matching product information;
    resume transmission of the one or more second portions of the newsletter template, wherein during the transmission further causing the one or more processors to:
        upon detection of a variable field in the one or more second portions of the newsletter template, populate the variable field in the newsletter template with the obtained information; and
        format the newsletter template, wherein the formatting comprises placing the matching portion of the product information in a predetermined location of the newsletter template based on the determined relevancy;

determine whether the end of the newsletter template has been reached; and continue the transmission of the one or more second portions of the newsletter template to the mail server until determining that the end of the newsletter template has been reached, wherein no version of the newsletter template with one or more variable fields completed is stored on the system other than on the mail server associated with the first individual.

6. The system of claim 5, wherein the newsletter template is an HTML document.

7. The system of claim 5, wherein the newsletter template is a text document.

8. The system of claim 5, wherein at least one of the variable fields in the newsletter template is provided with data that is a Uniform Resource Locator (URL) link.

9. A non-transitory computer-readable medium storing computer-executable instructions, that when executed by a computer processor, cause a computer to:

retrieving a profile associated with a first individual, wherein the profile comprises one or more preferences and a corresponding level of interest for each preference;

identifying a newsletter template associated with the retrieved profile, said newsletter template having one or more variable fields identifying an e-mail address associated with the first individual from the retrieved profile;

establishing a connection with a mail server associated with the identified e-mail address;

initiating transmission of the newsletter template to the mail server, wherein the newsletter template comprises a first portion and one or more second portions;

receiving the first portion of the newsletter template at the mail server;

suspending the transmission of the one or more second portions of the newsletter template, wherein during the suspension comprises:

searching, at a database, product information from one or more product providers associated with the newsletter;

determining at least a portion of the product information that matches the profile associated with the first individual, wherein the determination is performed by applying algorithm rules in order to compare, based on matching criteria, the product information and the profile associated with the first individual;

determining a relevancy level associated with the matching portion of the product information based on the preference and the corresponding level of interest associated with the matching portion of the product information; and obtaining, from the database, information to be populated in the variable field, wherein the information is associated with the first individual based on determining the matching product information;

resuming transmission of the one or more second portions of the newsletter template, wherein during the transmission comprises:

upon detection of a variable field in the one or more second portions of the newsletter template, populating the variable field in the newsletter template with the obtained information; and formatting the newsletter template, wherein the formatting comprises placing the matching portion of the product information in a predetermined location of the newsletter template based on the determined relevancy;

determining whether the end of the newsletter template has been reached; and continuing the transmission of the one or more second portion of the newsletter template to the mail server until determining that the end of the newsletter template has been reached, wherein no version of the newsletter template with one or more variable fields completed is stored other than on the mail server associated with the first individual.

10. The computer program product of claim 9, wherein the newsletter template is an HTML document.

11. The computer program product of claim 9, wherein the newsletter template is a text document.

12. The computer program product of claim 9, wherein at least one of the variable fields in the newsletter template is provided with data that is a Uniform Resource Locator (URL) link.

\* \* \* \* \*